(12) United States Patent
Norell

(10) Patent No.: US 8,508,178 B2
(45) Date of Patent: Aug. 13, 2013

(54) TORQUE BASED ELECTRONIC PULSE WIDTH MODULATION CONTROL SYSTEM FOR A SWITCHED RELUCTANCE MOTOR

(75) Inventor: Neil N. Norell, Vestal, NY (US)

(73) Assignee: Shop Vac Corporation, Williamsport, PA (US)

( * ) Notice: Subject to any disclaimer, the term of this patent is extended or adjusted under 35 U.S.C. 154(b) by 216 days.

(21) Appl. No.: 13/072,929

(22) Filed: Mar. 28, 2011

(65) Prior Publication Data

US 2011/0234132 A1    Sep. 29, 2011

Related U.S. Application Data

(60) Provisional application No. 61/318,186, filed on Mar. 26, 2010.

(51) Int. Cl.
*H02P 7/29* (2006.01)
*H02P 6/14* (2006.01)
*H02P 25/08* (2006.01)

(52) U.S. Cl.
USPC ...... 318/701; 318/400.14; 318/811; 318/721; 318/254.1

(58) Field of Classification Search
USPC .............. 318/701, 720–724, 400.14, 602, 318/599, 811, 799, 437, 254.1; 310/168, 310/162, 68 R
See application file for complete search history.

(56) References Cited

U.S. PATENT DOCUMENTS

| | | | | | |
|---|---|---|---|---|---|
| 4,546,293 | A | * | 10/1985 | Peterson et al. | 318/400.14 |
| 5,012,171 | A | * | 4/1991 | Sember | 318/696 |
| 5,012,172 | A | * | 4/1991 | Sember | 318/696 |
| 5,440,218 | A | * | 8/1995 | Oldenkamp | 318/701 |
| 5,563,488 | A | * | 10/1996 | Stephenson et al. | 318/701 |
| 5,789,893 | A | * | 8/1998 | Watkins | 318/701 |
| 5,796,226 | A |   | 8/1998 | Ookawa et al. | |
| 5,838,123 | A |   | 11/1998 | Zhao | |
| 6,081,083 | A | * | 6/2000 | Nashiki | 318/254.2 |
| 6,943,524 | B2 | * | 9/2005 | Branecky | 318/701 |
| 7,050,929 | B2 |   | 5/2006 | Norell et al. | |
| 7,750,594 | B2 | * | 7/2010 | Clothier et al. | 318/799 |
| 2005/0258788 | A1 | * | 11/2005 | Mori et al. | 318/254 |

(Continued)

OTHER PUBLICATIONS

International Search Report for Application No. PCT/US2011/034914 dated Feb. 27, 2013.
Written Opinion for Application No. PCT/US2011/034914 dated Feb. 27, 2013.

*Primary Examiner* — Eduardo Colon Santana
(74) *Attorney, Agent, or Firm* — Marshall, Gerstein & Borun LLP; Randall G. Rueth

(57) ABSTRACT

Methods and systems of accelerating a brushless, DC electric motor based on torque may include determining a slope based on a maximum torque of the BLDC motor at a lower operating load and a maximum torque of the motor at a higher operating load, determining a period of the rotor based on sensor signals, and determining and applying a phase advance to a PWM pulse for a subsequent revolution of the rotor based on the period and the slope. In some embodiments, the amount of the phase advance is further based on maximum load optimum advance and/or maximum load speed. In some embodiments, a phase dwell is determined based on a positive torque zone and applied to the PWM pulse. In some embodiments, when the motor is operating below a given threshold, fixed-width PWM pulses are applied to subsequent revolutions of the rotor instead of phase-advanced PWM pulses.

23 Claims, 28 Drawing Sheets

(56) References Cited

U.S. PATENT DOCUMENTS

| | | | |
|---|---|---|---|
| 2006/0091755 A1* | 5/2006 | Carlisle | 310/168 |
| 2006/0138994 A1* | 6/2006 | Cheng | 318/807 |
| 2007/0252551 A1 | 11/2007 | Clothier et al. | |
| 2008/0018274 A1* | 1/2008 | Mori et al. | 318/268 |
| 2009/0009113 A1* | 1/2009 | Rodriguez et al. | 318/400.15 |
| 2011/0234131 A1* | 9/2011 | Norell | 318/400.09 |
| 2012/0206078 A1* | 8/2012 | Norell et al. | 318/400.42 |

\* cited by examiner

TORQUE BASED ELECTRONIC PULSE WIDTH MODULATION CONTROL SYSTEM FOR A SWITCHED RELUCTANCE MOTOR

CROSS REFERENCE TO RELATED APPLICATIONS

The present application claims the benefit of U.S. Provisional Patent Application No. 61/318,186, entitled "SWITCHED RELUCTANCE MOTOR," filed on Mar. 26, 2010, the entire disclosure of which is hereby incorporated by reference herein. The present application is also related to U.S. patent application Ser. No. 13/073,474, entitled "METHOD AND APPARATUS FOR CONTROLLING PULSE-WIDTH MODULATION IN AN ELECTRIC MOTOR," filed on the same day as the present application, and which is hereby incorporated by reference herein in its entirety.

TECHNICAL FIELD

This disclosure relates generally to electric motors and, more particularly, to controlling pulse-width modulation pulses used to accelerate an electric motor.

BACKGROUND

A switched reluctance motor is an electrical motor that includes a rotor and a stator. Torque in a reluctance motor is produced by the tendency of the rotor to move to a position relative to the stator in which the reluctance of a magnetic circuit is minimized, i.e. a position in which the inductance of an energized stator winding is maximized. In a switched reluctance motor, circuitry is provided for detecting the angular position of the rotor and sequentially energizing phases of the stator windings as a function of rotor position.

Switched reluctance motors are doubly salient motors having poles on both the stator and the rotor, with windings only on the stator poles. The rotor of a switched reluctance motor does not include commutators or windings. In some cases, the rotor of a switched reluctance motor does not include permanent magnets. Switched reluctance motors have a variety of uses, including vacuum cleaners, for example.

Torque may be produced by energizing or applying current to the stator windings of the stator poles associated with a particular phase in a pre-determined sequence. The energization of the stator windings is typically synchronized with the rotational position of the rotor. A magnetic force of attraction results between the poles of the rotor and the energized stator poles associated with a particular phase, thereby causing the rotor poles to move into alignment with the energized stator poles.

In typical operation, each time a stator winding of the switched reluctance motor is energized, magnetic flux flows from the energized stator poles associated with a particular phase, across an air gap located between the stator poles and the rotor poles. Magnetic flux generated across the air gap between the rotor poles and the stator poles produces a magnetic field in the air gap that causes the rotor poles to move into alignment with the energized stator poles associated with a particular phase, thereby producing torque. The amount of magnetic flux and, therefore, the amount of torque generated by the switched reluctance motor is dependent upon many variables such as, for example, the magnetic properties of the material of the rotor poles and the stator poles, and the length of the air gap between the rotor poles and the stator poles.

The magnetic flux generated can be divided into a main torque-producing flux and leakage flux. The main flux is the flux that flows through the rotor poles and the excited stator poles. This main flux produces a torque on the rotor that will tend to align the rotor poles through which the flux passes with the excited stator poles. Leakage flux is undesirable in switched reluctance motors because it directly reduces torque production. More specifically, leakage flux causes the motor to produce a torque in a direction that is opposite to the direction of rotation of the rotor, also known as a braking torque. It is known that modifications to the rotor pole face may affect torque production in the switched reluctance motor.

BRIEF DESCRIPTION OF THE DRAWINGS

Various embodiments of the present invention are illustrated by way of examples and not limitations in the accompanying figures, in which like references indicate similar elements, and in which.

SUMMARY

Figure 1:
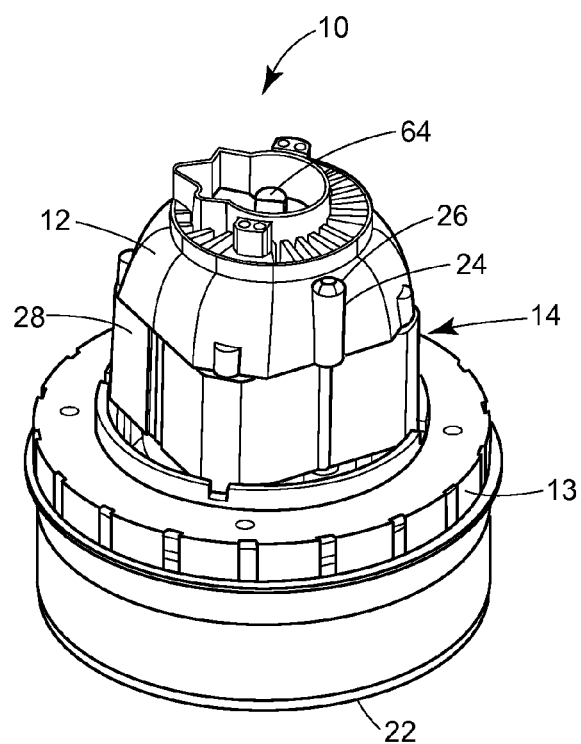
FIG. 1 is a perspective view of a switched reluctance motor, including a stator and a rotor.

Embodiments of a method of accelerating a brushless, direct current (BLDC) electric or switched reluctance (SR) motor based on torque are disclosed. The method may include applying pulse-width modulation (PWM) pulses to a plurality of stator poles of a stator in the BLDC motor to cause a rotor having a plurality of rotor poles to rotate, and determining a slope based on a maximum torque of the motor while operating at a higher load and a maximum torque of the motor while operating at a lower load. The method may include generating signals based on rotor revolution, determining a period of a full or a partial rotor revolution based on the generated signals, and determining a phase advance for a subsequent full or a subsequent partial revolution of the rotor based on the period and the slope. The phase advance may be applied to a subsequent pulse-width modulation pulse applied to one or more stator poles and corresponding to the subsequent full or subsequent partial revolution of the rotor.

Embodiments of a system for controlling pulse-width modulation for a switched reluctance or BLDC motor are disclosed. The system may include a controller, a stator of the switched reluctance or BLDC motor including a plurality of stator poles and communicatively coupled to the controller, and a rotor of the switched reluctance or BLDC motor configured to rotate in response to the PWM pulses applied to the stator poles. The system may include a memory having computer-executable instructions stored thereon for controlling acceleration of the motor based on torque, including instructions for determining a period of a first rotation of the rotor based on signals corresponding to a sensor, determining a phase advance for a subsequent rotation of the rotor based on the period of the first rotation and a slope, where the slope is based on a maximum torque of the motor while operating at a higher load and a maximum torque of the motor while operating at a lower load. The computer-executable instructions may include applying the phase advance to a subsequent PWM pulse applied to one or more stator poles and corresponding to the subsequent rotation of the rotor.

Embodiments of a system for controlling PWM modulation of a switched reluctance or BLDC motor are disclosed. The system may include a controller in electrical communication with a plurality of stator poles of a stator the motor, and a memory included in the controller and including computer-executable instructions. The computer-executable instructions may be executable by a processor to communicate that fixed-width PWM pulses are to be applied to the stator poles when a rotational speed of the rotor is less than or equal to a threshold, and that torque-based PWM pulses are to be applied to stator poles when the rotational speed of the rotor is greater than the threshold. Determining torque-based PWM pulses may include, for each PWM pulse, determining a period of an immediately previous partial revolution of the rotor based on signals corresponding to a sensor, and determining a phase advance, a positive torque zone and a phase dwell for the each PWM pulse. The phase advance may be based on the period of the immediately previous partial rotor revolution and a slope, where the slope may be based on a maximum torque of the motor while operating at a higher load and a maximum torque of the motor while operating at a lower load. The positive torque zone may be based on a portion of the radial relationship between the rotor and the stator where a torque in a desired direction of rotor rotation is produced when a phase of the stator is energized, and the phase dwell may be based on the positive torque zone and the period of the immediately previous partial revolution of the rotor.

DETAILED DESCRIPTION OF THE EXAMPLES

Figure 2:
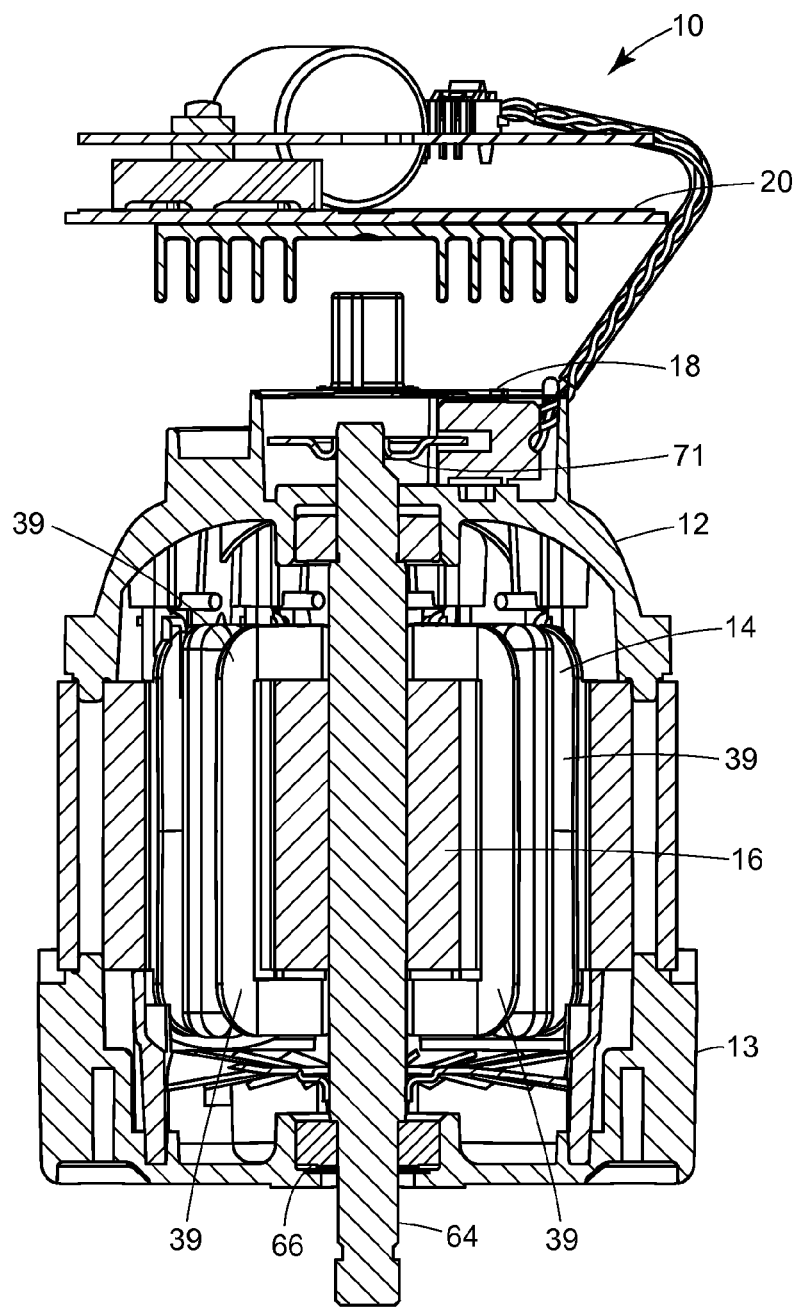
FIG. 2 is a sectional view of the motor shown in FIG. 1.

Referring to FIGS. 1-2, a switched reluctance motor 10 may be constructed as a package or unit of subassemblies, each of which may be separately preassembled and combined together during a manufacturing process. Specifically, the motor 10 may include an upper housing unit 12, a lower housing unit 13, a stator 14, a rotor 16, a drive assembly 18, a first end cap 20, and a second end cap 22. Both the upper housing unit 12 and the lower housing unit 13 may be annular in shape, with the first end cap 20 being coupled to the upper housing unit 12, and the second end cap 22 being coupled to the lower housing unit 13. As shown in FIGS. 1-2, each of the upper housing unit 12, the lower housing unit 13, the stator 14, the rotor 16, the drive assembly 18, the first end cap 20, and the second end cap 22 may be combined into a single package or unit.

The upper housing unit 12 may include a plurality of apertures 24 for receiving a plurality of fasteners 26 to secure the upper housing unit 12 to the stator 14 during assembly. It should be understood, however, that the upper housing unit 12 may be secured to the stator 14 in any other suitable manner such as, for example, by a clamp, a mounting bracket/flange, or the like.

Figure 3:
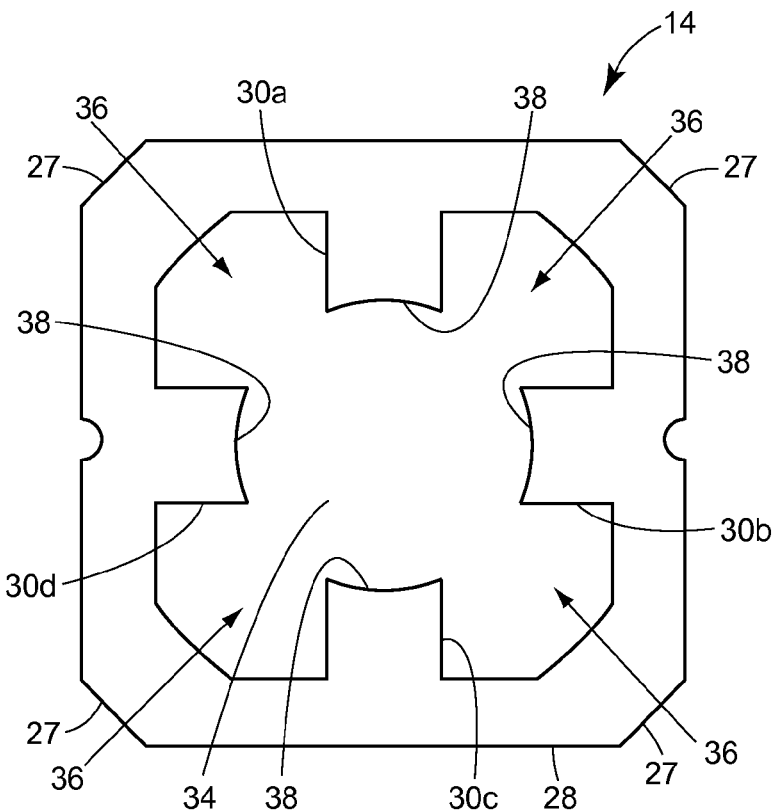
FIG. 3 is a cross-sectional view of a stator core of the motor shown in FIG. 1.

Referring to FIG. 3, the stator 14 may be constructed in a square-type configuration, with slanting or chamfered portions 27 at the four corners of the stator 14. It should be understood, however, that the stator 14 may have other configurations as well such as, for example, a circular configuration, an oval configuration, a rectangular configuration, or the like.

The stator 14 includes a stator core 28, a plurality of equally spaced stator poles 30, and stator windings 32 (FIGS. 7-8 and 10) disposed on the stator core 28. The stator core 28 includes an inner surface that defines a central bore 34. The stator core 28 may be stamped or formed from a plurality of laminated sheets, or laminations, of ferromagnetic material such as, for example, steel. Laminated sheets may be used in the stator core 28 to control eddy currents and, thereby avoid overheating of the stator core 28. The stator laminations may be laminated together in a conventional manner and arranged in a back-to-back configuration.

As shown in FIG. 3, the plurality of equally spaced stator poles 30 is arranged in a circumferential path about the stator core 28. It should be understood that the stator poles 30 and the stator core 28 may be formed as one, integral piece. In the embodiment illustrated in FIG. 3, the stator 14 includes four circumferentially spaced-apart stator poles 30a, 30b, 30c, 30d projecting inwardly from the stator core 28 toward the central bore 34. The stator poles 30a-d may cooperate to define inwardly opening slots 36, each of which receives coils of wire during a stator winding operation. Each of the stator poles 30a-d includes a stator pole face 38 at the end projecting into the central bore 34. The stator pole face 38 may be generally convex in shape.

Figure 4:
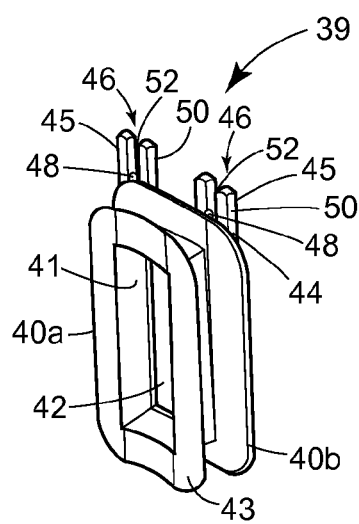
FIG. 4 is a perspective view of one of a plurality of bobbins associated with the stator of the motor shown in FIG. 1, including a plurality of wire retainers located at an upper portion of each of the plurality of bobbins.

The stator windings 32 are conventional and may be, for example, polyester-coated wires or magnetic wires prewound into coils and placed on a bobbin 39 (FIGS. 1 and 4).

Referring to FIG. 4, the bobbin 39, which may be disposed on each of the stator poles 30, may include a front plate 40a and a back plate 40b that is spaced apart from the front plate 40a. The front plate 40a and the back plate 40b may be connected together by a connecting member 41 to define an opening 42 that extends through the bobbin 39. During a stator winding operation, stator windings 32 may be wound around the connecting member 41 located between the front plate 40a and the back plate 40b of each of the plurality of bobbins 39. The bobbin 39 acts as an insulation barrier between the stator windings 32 and the stator core 28. Each of the prewound bobbins 39, which may include approximately 95 turns of wire per stator pole 30, may then be placed over individual stator poles 30 such that each of the stator poles 30 extends through the opening 42 of the bobbin 39 with the stator pole face 38 being flush with an exterior side 43 of the front plate 40a. As a result, the sides of the front plate 40a and the back plate 40b of each of the plurality of prewound bobbins 39 may extend radially and outwardly into the slots 36 of the stator 14.

Each of the plurality of bobbins 39 may further include wire retainers 44 located at an upper portion of the back plate 40b of each of the plurality of bobbins 39. As shown in FIG. 4, each of the wire retainers 44 may include a prong structure 45 located at opposite sides of the upper portion of the back plate 40b of each of the plurality of bobbins 39. Each of the prong structures 45 may include a groove 46 for receiving an end 48 of the stator winding 32 disposed on each of the plurality of bobbins 39 during a stator winding operation.

Each of the prong structures 45 may further include an outer portion 50 and an inner portion 52 that is disposed within the outer portion 50. The outer portion 50 may be composed of a nonconductive material such as, for example, plastic. The inner portion 52, which may include the groove 46, may be composed of a conductive material such as, for example, metal. The conductive material of the inner portion 52 serves to provide an electrical connection between the conductive inner portion 52 and the end 48 of the stator winding 38 disposed on each of the plurality of bobbins 39.

Figure 5:
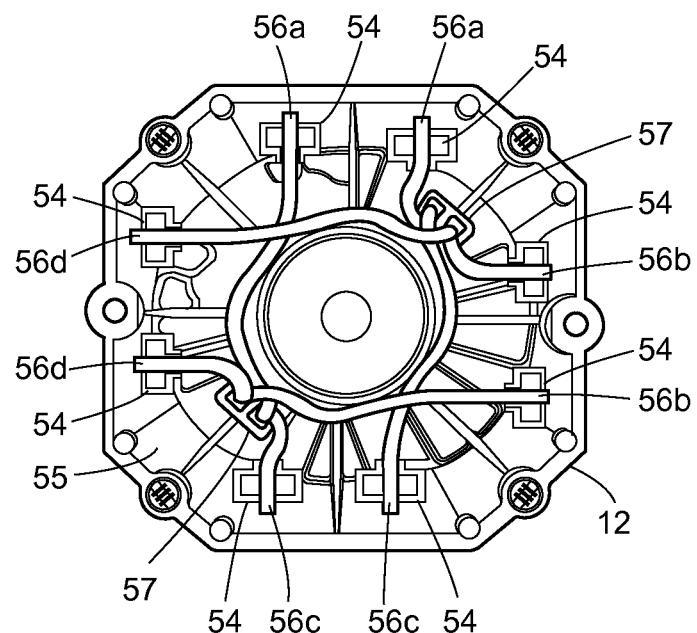
FIG. 5 is a top view of an upper housing unit of the motor, including a second plurality of mounting elements for receiving an upper portion of each of the plurality of bobbins of the stator.

Referring to FIGS. 5-8, the upper housing unit 12 of the motor 10 is shown. The upper housing unit 12 includes a plurality of upper mounting elements 54 disposed in an inner region 55 of the upper housing unit 12. Each of the plurality of upper mounting elements 54 engages an upper portion of a bobbin 39 disposed on a stator pole 30 during assembly. The plurality of upper mounting elements 54 act to secure the upper portion of each of the plurality of bobbins 39 against displacement during motor operation. As shown in FIG. 5, wire leads 56a-d are disposed in each of the plurality of upper mounting elements 54 and electrically connected together via connection terminals 57. More specifically, wire leads 56a are connected to wire leads 56c via connection terminals 57. Likewise wire leads 56b are connected to wire leads 56d via connection terminals 57. As will be discussed in greater detail below, the wire leads 56a-d are connected together in this manner so that when the stator 14 is mounted to the upper housing unit 12 during assembly, the stator windings 32 disposed on the stator poles 30a are electrically connected in parallel with the stator windings 32 disposed on the stator poles 30c. Likewise, when the stator 14 is mounted to the upper housing unit 12 during assembly, the stator windings 32 disposed on the stator poles 30b are electrically connected in parallel with the stator windings 32 disposed on the stator poles 30d.

Figure 6:
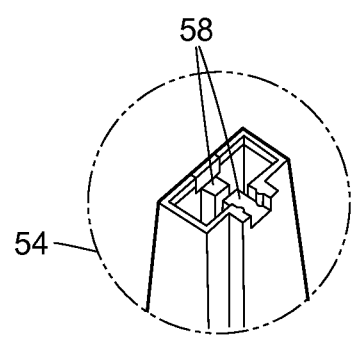
FIG. 6 is an enlarged perspective view of one of the second plurality of mounting elements shown in FIG. 5.

Referring to FIG. 6, an enlarged perspective view of one of the plurality of upper mounting elements 54 is shown. As shown in FIG. 6, each of the wire leads 56 of FIG. 5 is disposed within a conductor anvil 58 of the upper mounting element 54 and securely held in place. Conductor anvils 58 are well known in the art and are, therefore, not discussed further herein.

Figure 7:
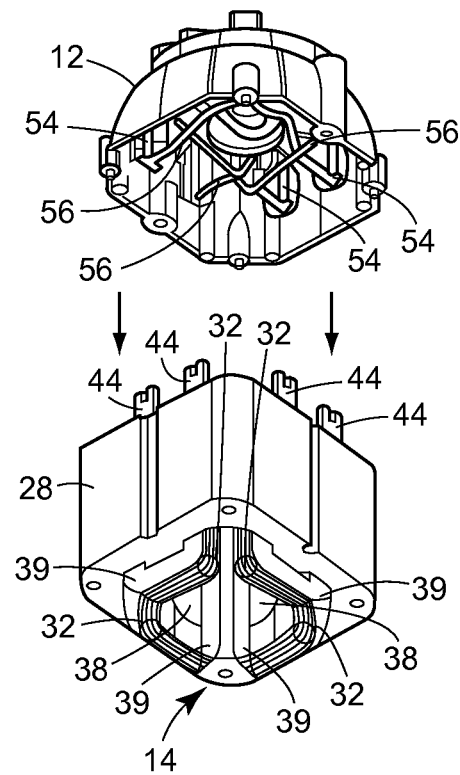
FIG. 7 is an exploded perspective view of the stator and the upper housing unit before assembly.

FIG. 7 is an exploded perspective view of the stator 14 and the upper housing unit 12 before assembly. As shown in FIG. 7, the plurality of wire retainers 44 associated with the bobbins 39 disposed on the stator poles 30 engage with the plurality of upper mounting elements 54 when the stator 14 is mounted to the upper housing unit 12 during assembly. More specifically, the prong structures 45 associated with each of the wire retainers 44 associated with the bobbins 39 disposed on each of the stator poles 30 are adapted to matingly engage each of the plurality of upper mounting elements 54 of the upper housing unit 12 when the upper housing unit 12 is mounted to the stator 14 during assembly. In this manner, the prong structures 45 associated with each of the wire retainers 44 of the bobbins 39 engage each of the plurality of upper mounting elements 54 so as to secure the bobbins 39 against displacement during motor operation, and thereby eliminate or reduce the need for additional hardware for holding the bobbins 39 in place during motor operation.

Figure 8:
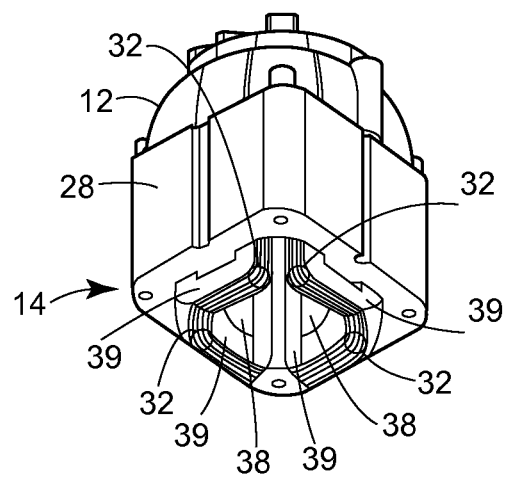
FIG. 8 is a perspective view of the stator mounted to the upper housing unit after assembly.

After the upper housing unit 12 is mounted to the stator 14, the wire leads 56a-d disposed in the plurality of upper mounting elements 54 are electrically connected to the stator windings 32 disposed on the stator poles 30a-d. Because the wire leads 56a are electrically connected in parallel with the wire leads 56c, the stator windings 32 disposed on the stator poles 30a are electrically connected in parallel with the stator windings 32 disposed on the stator poles 30c to form one phase. Likewise, because the wire leads 56b are electrically connected in parallel with the wire leads 56d, the stator windings 32 disposed on the stator poles 30b are electrically connected in parallel with the stator windings 32 disposed on the stator poles 30d to form another phase. FIG. 8 is a perspective view of the upper housing unit 12 mounted to the stator 14 after assembly.

Figure 9:
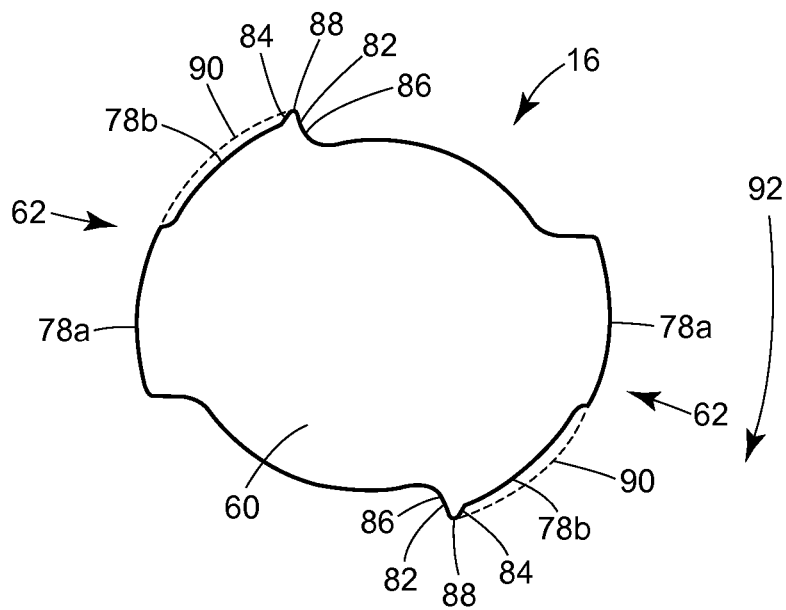
FIG. 9 is a view of the rotor of the motor shown in FIG. 1.
Figure 10:
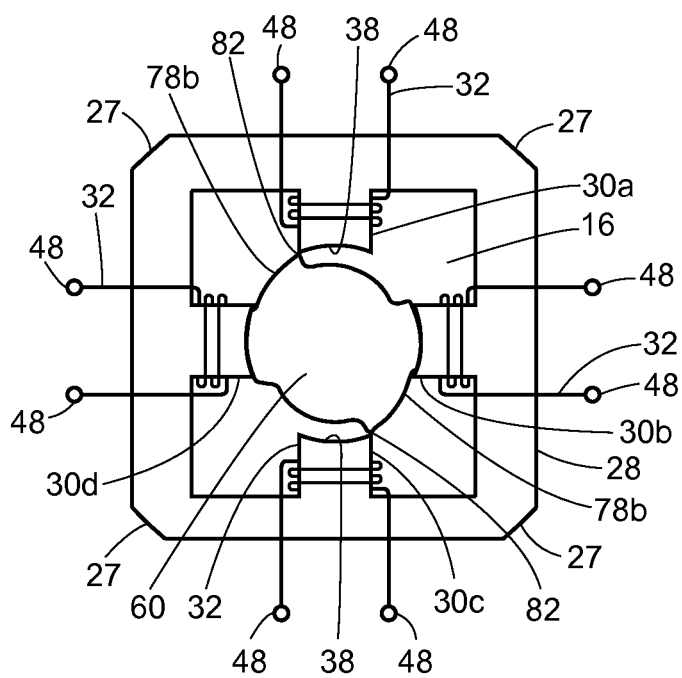
FIG. 10 is a cross-sectional view of the rotor of the motor shown in FIG. 1 disposed within an inner region of the stator core.

Referring to FIGS. 9-10, the rotor 16 may include a rotor core 60 and a plurality of equally spaced laminated rotor poles 62. The rotor core 60 is disposed within the central bore 34 and is coupled to a shaft 64 (FIGS. 1-2). The shaft 64 is mounted through a bearing 66 for rotation concentric to the stator 14. The shaft 64 extends through the rotor core 60 and is coupled to a slotted disk 71. As will be described in greater detail below, when the slotted disk 71 rotates, the angular position of the rotor 16 may be determined. The shaft 64 is also coupled to a load such as, for example, a fan of the vacuum cleaner (not shown) or other driven device. The rotor core 60 may be stamped or formed from a plurality of laminated sheets, or laminations, of ferromagnetic material such as, for example, steel. The rotor laminations may be laminated together in a conventional manner and arranged in a back-to-back configuration.

As shown in FIGS. 9-10, the plurality of rotor poles 62 are arranged in a circumferential path about the rotor core 60. The rotor poles 62 may project radially and outwardly from the shaft 64 to facilitate the rotation of the rotor 16 within the central bore 34 of the stator 14.

It is known that magnetic flux generated across the air gap between an energized stator pole 30 and a rotor pole 62 of the motor 10 creates an attractive force between the energized stator pole 30 and the rotor pole 62. The amount of attractive force is dependent upon many variables such as, for example, the magnetic properties of the materials of the stator pole 30 and the rotor pole 62, and the size of the air gap between the energized stator pole 30 and the rotor pole 62. It is further known that the attractive force between the energized stator pole 30 and the rotor pole 62 increases as the magnetic reluctance (i.e., resistance) of the magnetic circuit formed by the energized stator pole 30 and the rotor pole 62 is reduced. In other words, the low permeability properties associated with the air gap of the magnetic circuit replaces the high permeability properties of the ferromagnetic material associated with the rotor core 60. Lowering the reluctance of the air gap between the energized stator pole 30 and the rotor pole 62 by reducing its size may, in turn, increase the flux densities in the air gap such that an angle of optimum torque generation is realized. Additionally, by replacing a portion of the air gap (i.e., a low permeability medium) with steel (i.e., a high permeability medium) and keeping the magnetic field strength the same, the flux density of the air gap between the energized stator pole 30 and the rotor pole 62 is increased in accordance with the following equation:

$$B = H\mu \qquad \text{(Eq. 1)}$$

where:
B is the magnetic flux density;
H is the magnetic field strength; and
μ is the permeability property.

Increasing flux density of the air gap (i.e., increasing the force) increases the torque of the rotor 16 in accordance with the following equation:

$$\text{Torque} = \text{Force} \times \text{Distance from Axis} \qquad \text{(Eq. 2)}$$

Figure 11:
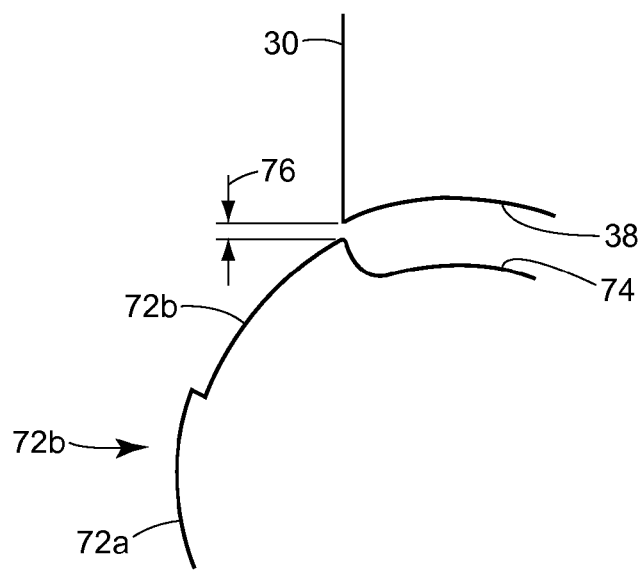
FIG. 11 is an enlarged partial view of a pole of a prior art rotor approaching a stator pole.

Referring to FIG. 11, an enlarged partial view of a rotor pole face 72 of a prior art rotor 74 is shown as it approaches a stator pole 30 in a clockwise direction. As shown in FIG. 11, the rotor pole face 72 may include a first portion 72a and a second portion 72b that is radially inwardly stepped or undercut with respect to the first portion 72a. The stepped second portion 72b creates a non-uniform or stepped air gap 76 between the rotor pole face 72 of the prior art rotor 74 and a corresponding stator pole face 38 associated with an energized stator pole 30 during rotation of the prior art rotor 74. The stepped or undercut nature of the second portion 72b of the rotor pole face 72 relative to the first portion 72a facilitates starting of the motor 10 in one direction by increasing the torque in a desired direction of rotation. It should be understood that starting of the motor 10 may be facilitated in the opposite direction by changing the orientation of the stepped or undercut portion. For example, if the first portion 72a is stepped or undercut relative to the second portion 72b, the motor 10 may be started in the opposite direction.

Figure 12:
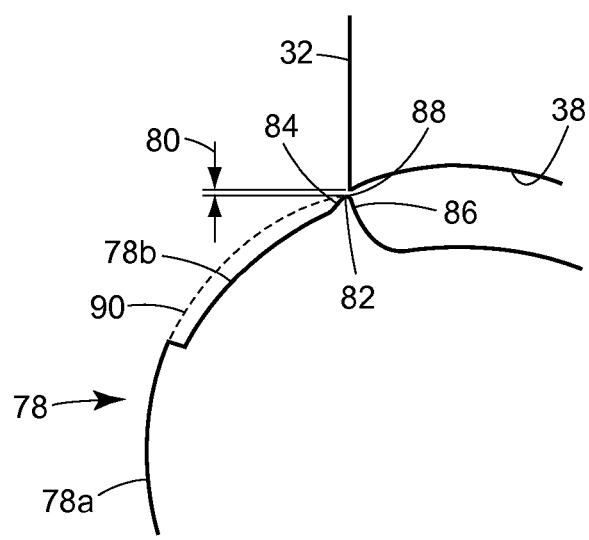
FIG. 12 is an enlarged partial view of a rotor pole of the motor shown in FIG. 1 approaching a stator pole.

Referring to FIG. 12, an enlarged partial view of a rotor pole 62 of the rotor 16 in accordance with the present disclosure is shown as the rotor pole 62 approaches a stator pole 30 in a clockwise direction. As shown in FIG. 12, the rotor poles 62 may include a rotor pole face 78 that includes a first portion 78a and a second portion 78b that is radially inwardly stepped or undercut with respect to the first portion 78a. The stepped or undercut second portion 78b of the rotor pole face 78 creates a non-uniform or stepped air gap 80 between the second portion 78b of the rotor pole face 78 and a corresponding stator pole face 38 associated with an energized stator pole 30 during rotation of the rotor 16. As a result, the air gap 80 between the stepped or undercut second portion 78b of the rotor pole face 78 and the stator pole face 38 is larger than the air gap 80 between the first portion 78a of the rotor pole face 78 and the stator pole face 38.

Because the rotor 16 tends to rotate toward a position in which the air gap 80 is minimized and, therefore, inductance is maximized, the air gap 80 between the second portion 78b of the rotor pole face 78 and the stator pole face 38 (which is larger than the air gap 80 between the first portion 78a of the rotor pole face 78 and the stator pole face 38) ensures that the leading edge of the rotor pole face 78 is always attracted to the energized stator pole 30 during motor operation.

Additionally, the air gap 80 between the second portion 78b of the rotor pole face 78 and the stator pole face 38 (which is larger than the air gap 80 between the first portion 78a of the rotor pole face 78 and the stator pole face 38) ensures that the rotor 16 rotates in one direction only, i.e., the rotor 16 tends to rotate in the direction of the stepped or undercut portion. For example, if the stepped or undercut portion is located on the right side of the rotor pole face 78, the rotor 16 will tend to rotate to the right or in a clockwise direction. On the other hand, if the stepped or undercut portion is located on the left side of the rotor pole face 78, the rotor 16 will tend to rotate to the left or in a counter-clockwise direction.

Each of the rotor pole face 78 and the stator pole face 38 may define an arc, with the rotor pole face 78 being approximately twice as large as the stator pole face 38.

In accordance with one aspect of the present disclosure, a protrusion 82 may be located at a leading edge of the second portion 78b of the rotor pole face 78 that is remote from the first portion 78a of the rotor pole face 78. The protrusion 82 minimizes the air gap 80 at the edge of the second portion 78b of the rotor pole 62 for magnetic flux flow, thereby optimizing torque characteristics of the motor 10. The protrusion 82 is composed of the same or a similar material as the rest of the rotor 16, and includes a first side 84 and a second side 86. Each of the first side 84 and the second side 86 of the protrusion 82 tapers toward an end point 88 of the protrusion 82. As shown in FIG. 12, the end point 88 of the protrusion 82 may be tangential with a circumference 90 of the first portion 78a of the rotor pole face 78. More specifically, the first side 84 of the protrusion 82 may taper toward the end point 88 such that the first side 84 is slightly concave. Alternatively, the first side 84 of the protrusion 82 may taper toward the end point 88 such that the first side 84 is generally linear.

Figure 13A:
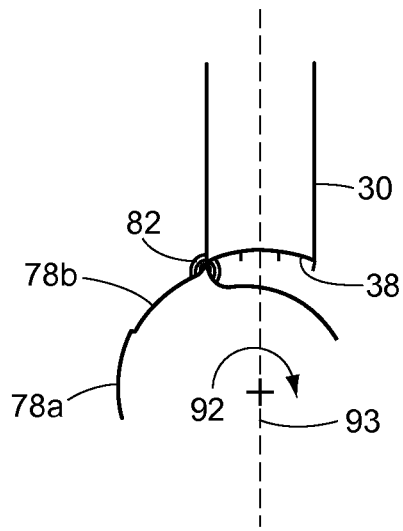
FIGS. 13A-13B are partial views of a rotor pole of the motor shown in FIG. 1 as it approaches the stator pole in a clockwise direction.
Figure 13B:
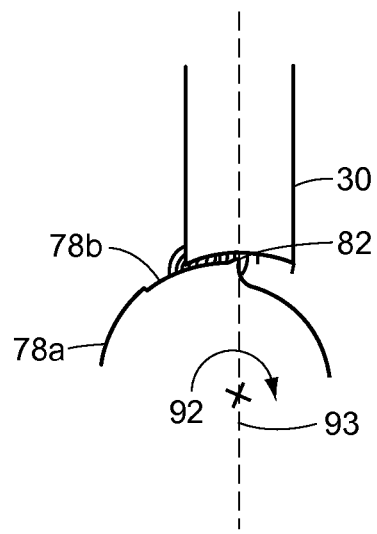

Referring to FIGS. 13A-13B, partial views of a rotor pole 62 of the rotor 16 of FIG. 9 are shown in a plurality of angular positions associated with one phase cycle. More specifically, FIGS. 13A-13B are partial views of the rotor pole 62 of the rotor 16 as the rotor pole 62 approaches the stator pole 30 in a clockwise direction indicated by arrow 92. For purposes of discussion, a stator pole reference line 93 is shown in FIGS. 13A-13B.

FIG. 13A shows the position of the rotor 16 near the beginning of a phase cycle. As shown in FIG. 13A, the air gap 80 between the protrusion 82 located at the edge of the second portion 78b of the rotor pole face 78 and the stator pole face 38 is smaller than the air gap 80 between the rest of the second portion 78b of the rotor pole face 78 and the stator pole face 38 in this position. As a result, the flux density at the air gap 80 between the protrusion 82 and the stator pole face 38 is maximized in this position, thereby causing the rotor 16 to be pulled toward the energized stator pole 30 in the direction of arrow 92.

Magnetic flux seeks the path of minimum reluctance. Therefore, because the rotor pole 62 is composed of a ferromagnetic material that has a lower reluctance than air, magnetic flux will more easily flow through the rotor pole 62 and the stator pole 30 than through the air gap 80.

FIG. 13B shows the position of the rotor 16 when the rotor 16 has been rotated in the direction of arrow 92 such that the end point 88 of the protrusion 82 is aligned with the stator pole reference line 93. After the protrusion 82 passes the stator pole reference line 93, the rotor 16 will tend to be pulled in the opposite direction of rotation, i.e., a counter-clockwise direction in this embodiment. However, this pulling in the opposite direction of rotation is offset by the positive motoring torque due to the first portion 78a of the rotor pole face 78. Therefore, the rotor 16 continues to be pulled toward the energized stator pole 30 in the direction of arrow 92.

Operation of the Control Circuit

Figure 14:
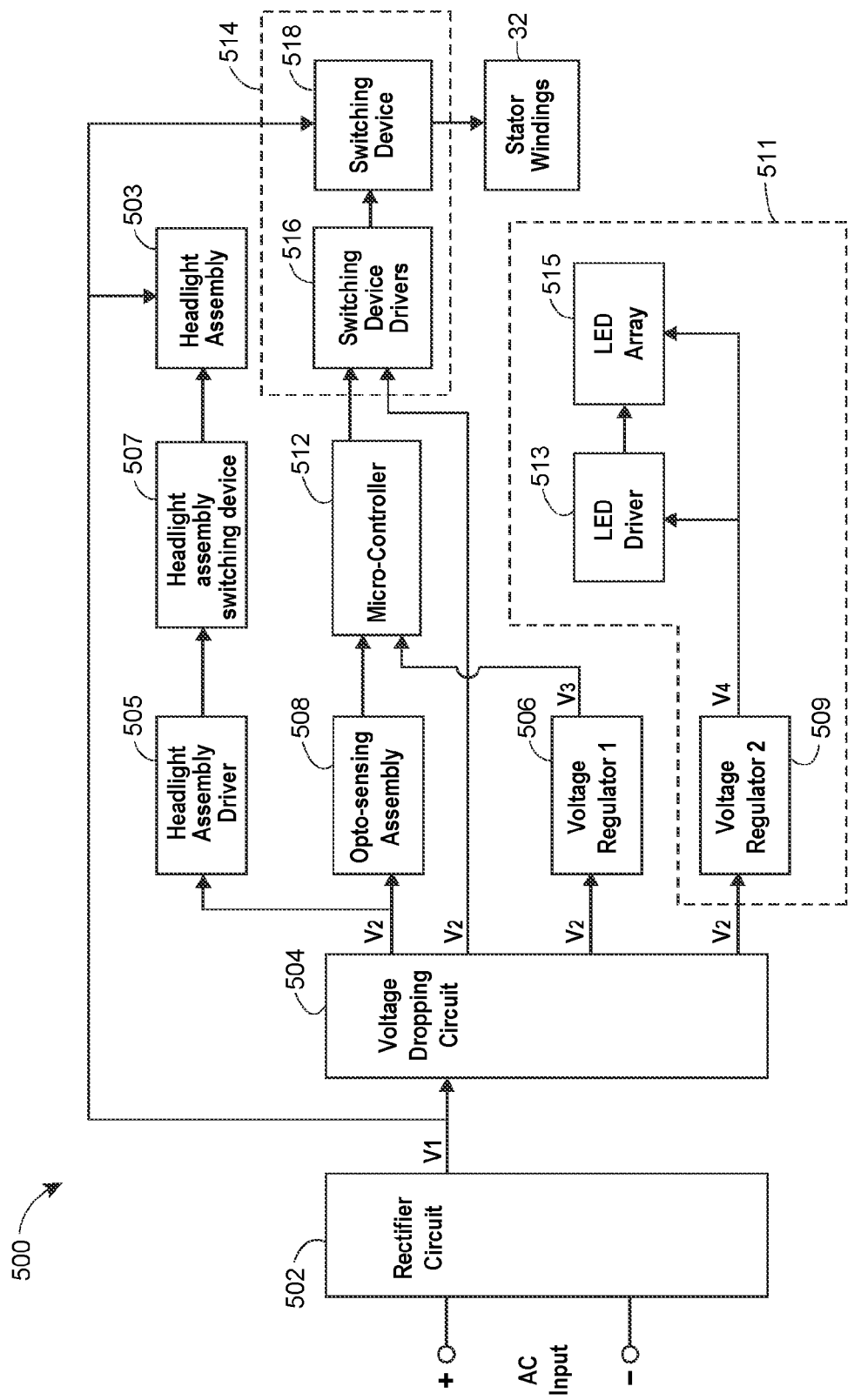
FIG. 14 illustrates a block diagram of a control circuit for the switched reluctance motor.

The drive assembly 18 used to drive the motor 10 includes a control circuit 500, which is further described with respect to FIG. 14. Embodiments of the control circuit 500 are also disclosed in U.S. Provisional Patent Application No. 61/318,186, entitled "Switched Reluctance Motor," filed on Mar. 26, 2010, the entire disclosure of which is incorporated by reference herein. Specifically, FIG. 14 illustrates a block diagram of an implementation of the control circuit 500, which may be used to control the operation of the motor 10 by controlling the power supply to the stator windings 32. While FIG. 14 illustrates various components of the control circuit 500, one of ordinary skill in the art will understand that the control circuit 500 may be suitably implemented with other and/or additional components which are not shown in FIG. 14 and/or are not described below.

The control circuit 500 includes a rectifier circuit 502 that converts an AC input voltage into an unregulated DC output voltage V1, which is fed to a headlight assembly 503 and to the stator windings 32 via a switching device 518, as discussed below. The DC output voltage V1 may also be fed to a voltage dropping circuit 504. The voltage dropping circuit 504 may provide a regulated voltage V2 to a headlight assembly driver 505 and to an opto-sensing assembly 508 which is electrically coupled to a micro-controller 512. The voltage dropping circuit 504 may also provide the regulated voltage V2 to a voltage regulator 506. The voltage regulator 506 may provide a voltage V3 to the micro-controller 512. The voltage dropping circuit 504 may also provide the regulated voltage V2 to a second voltage regulator 509. The second voltage regulator 509 may provide a voltage V4 to an LED driver 513 and an LED array 515 of an LED readout system 511, which will be described further below.

The headlight assembly driver 505 may control a headlight assembly switching device 507. The headlight assembly switching device 507 may be used to control the headlight assembly 503. The headlight assembly switching device 507 may be implemented by a number of electronic switching mechanisms, such as transistors, thyristors, etc.

The opto-sensing assembly 508 operates in conjunction with the slotted disk 71, which is rotatable with the rotor 16, to monitor the rotational speed of the motor 10. The opto-sensing assembly 508 generates a rotor position signal in response to rotation of the rotor 16. In some embodiments, the rotor position signal corresponds to rotation of the rotor 16, and more specifically, to rotation of each pole of the rotor 16. The rotor position signal may be sent to the micro-controller 512 and may be used by the micro-controller 512 to measure the speed of the rotor 16. The micro-controller 512 may include one or more of the commonly known components such as memory, a CPU, a plurality of registers, a plurality of timers, etc. The micro-controller 512 may also include a means to monitor temperature such as, for example, a built in thermistor and/or temperature controller.

The regulated voltage V2 generated by the voltage dropping circuit 504 may be input to a switching device driver 516 of a power module 514. The power module 514 may include the switching device driver 516 and the switching device 518. The switching device driver 516 may control the switching device 518, and may include one or more individual drivers based on a number of individual switches within the switching device 518. An example embodiment of the switching device driver 516 is described in greater detail below. The switching device driver 516 and the switching device 518 may be used to control the voltage input to the stator windings 32. The switching device 518 may be implemented by a number of electronic switching mechanisms, such as transistors, thyristors, etc. An implementation of the switching device 518 using insulated gate bipolar transistors (IGBTs) is illustrated in further detail below. The switching device 518 receives power V1 from the rectifier circuit 502 and provides the power to the stator windings 32 as per the control signals received from the switching device driver 516. The use of outputs from a switching device to control stator windings is well known to those of ordinary skill in the art, and therefore is not explained in further detail with respect to the outputs from the switching device 518 and the stator windings 32. Various components of the control circuit 500, and the operation thereof, are illustrated and explained in further detail below.

FIGS. 15A-15G illustrate schematic diagrams of an implementation of the control circuit 500 corresponding to the block diagram of FIG. 14. While FIGS. 15A-15G illustrate various components of the control circuit 500, not all of the components and the connections between the components may be described below. Additionally, one of ordinary skill will understand that the control circuit 500 may be implemented using other suitable components, combinations of components, and/or electronic circuitry.

Figure 15A:
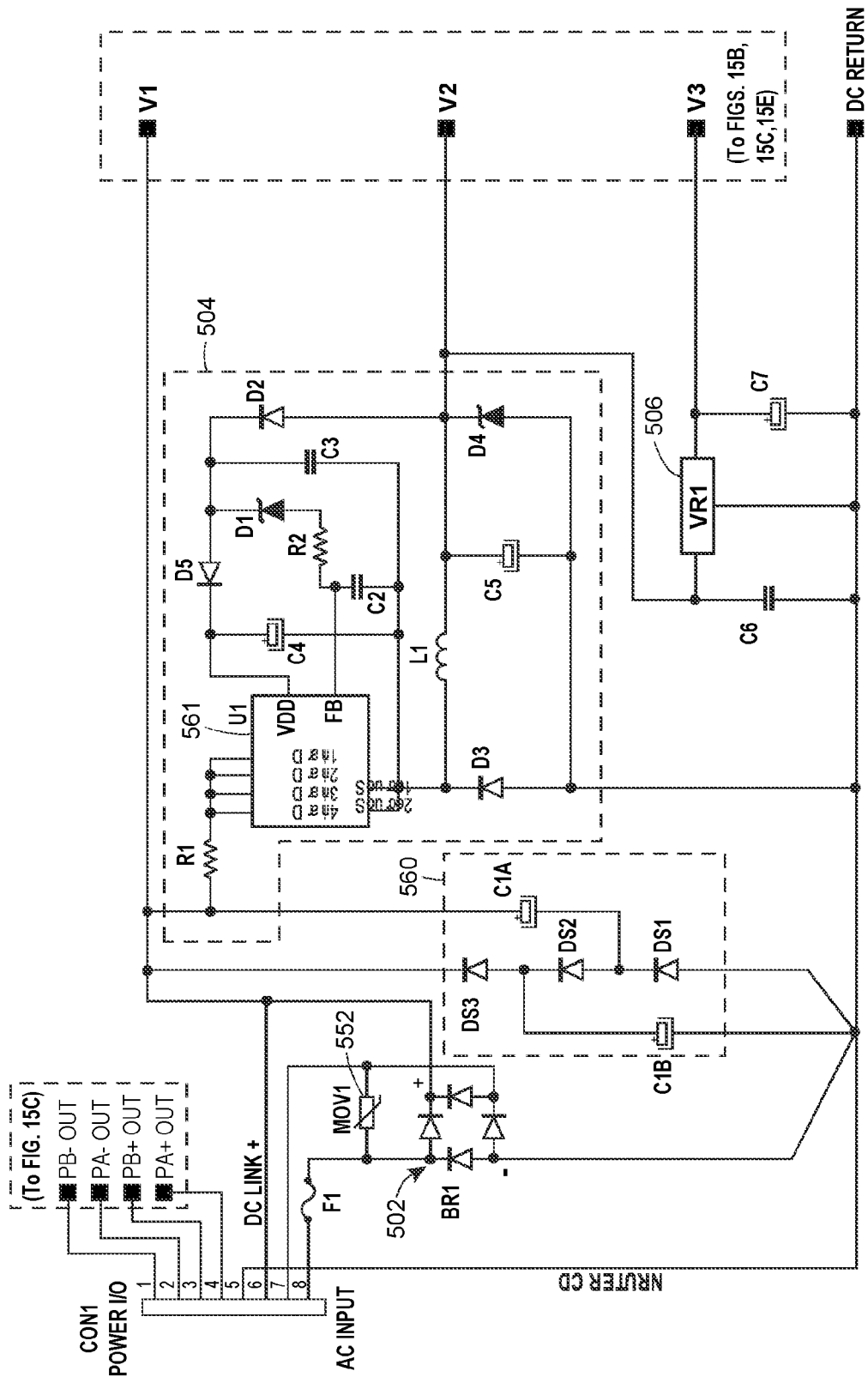
FIGS. 15A-15G illustrate circuit diagrams of the control circuit corresponding to the block diagram of FIG. 14.

FIG. 15A illustrates an exemplary implementation of the rectifier circuit 502. The rectifier circuit 502 may receive an AC input voltage of 120 V. In an alternate embodiment, a different AC input voltage may be used. The rectifier circuit 502 may be any of the commonly available rectifier circuits that convert an AC input voltage into an unregulated DC output voltage, such as a bridge rectifier. A varistor 552 may optionally be included to protect the control circuit 500 from excessive voltages.

The rectifier circuit 502 may generate the unregulated DC output voltage V1, as shown in FIG. 15A. The voltage V1 may contain AC ripple, which is preferably filtered before the voltage V1 is applied, as discussed above, to the voltage dropping circuit 504 and the switching device 518. Therefore, the first leg of the voltage V1 is applied to a DC bus filter network 560, as shown in FIG. 15A. The filter network 560 may include diodes DS1, DS2, DS3 and capacitors C1A and C1B. The filter network 560 filters out AC ripple from both the positive going power and the negative going power return legs of the first leg of the voltage V1. In one embodiment, the resulting filtered voltage output by the filter network 560 is 120 V DC under load, and it can source about 15 amperes of continuous current.

Figure 15B:
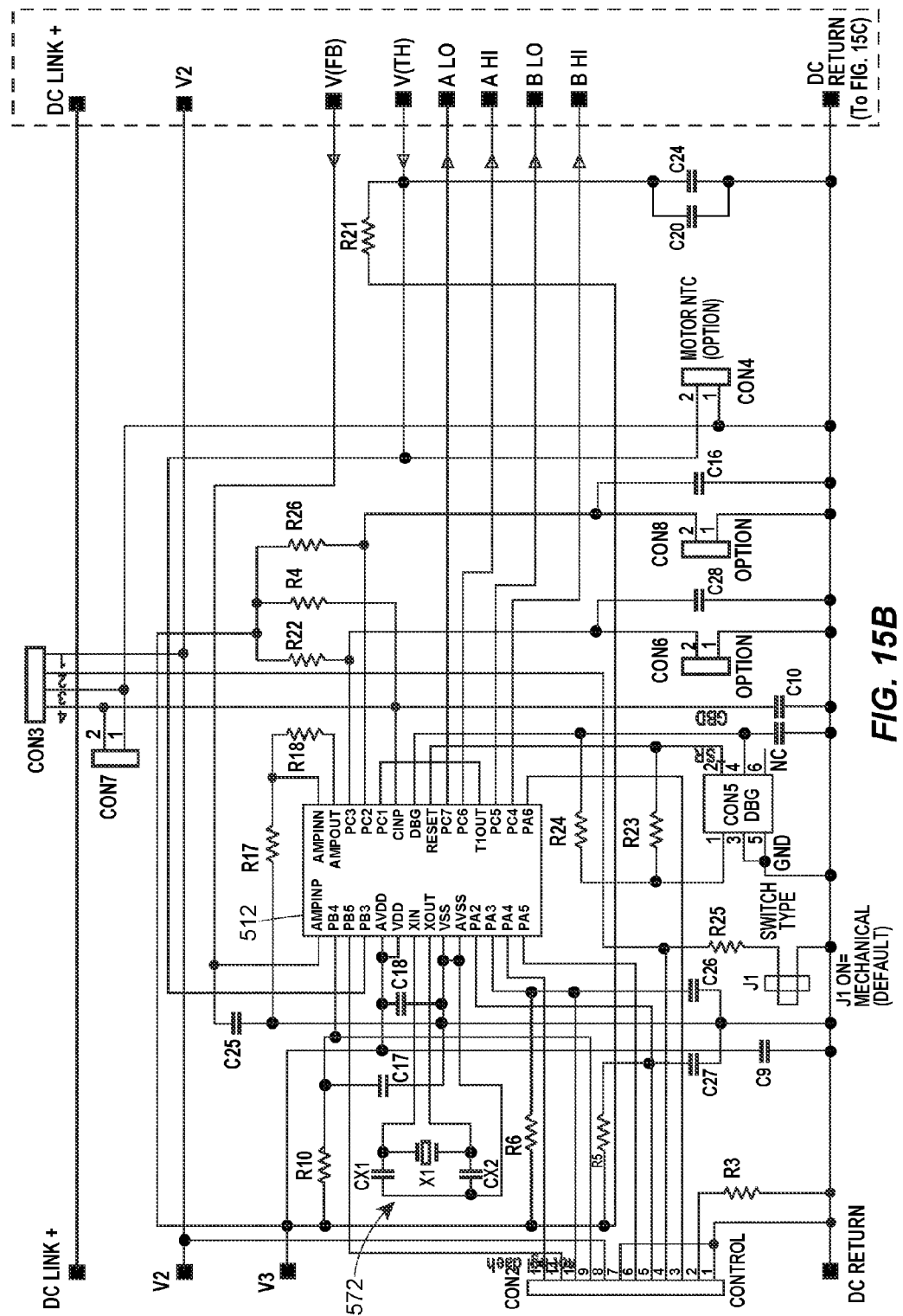

FIG. 15A further illustrates exemplary implementations of the voltage dropping circuit 504 and the voltage regulator 506. The voltage dropping circuit 504 may generate a DC output voltage V2 of, for example, 15 V, which is used to drive components and circuitry as described further below. The voltage dropping circuit 504 may be implemented using, for example, a low power off-line primary switcher 561. The low power off-line primary switcher 561 may be, for example, the VIPer22AS-E low power off-line primary switcher available from STMicroelectronics. Of course, other similar integrated circuits may be used in alternative embodiments. Alternatively, the voltage dropping circuit 504 may be implemented using other suitable means such as, for example, a set of dropping resistors, a Zener diode, and a capacitor. The output voltage V2 of the voltage dropping circuit 504 may be sourced through the opto-sensing assembly 508, as best seen in FIG. 15B. In this manner, the supply current to the opto-sensing assembly 508 is not directly dissipated by, for example, resistors of the voltage dropping circuit 504, and the opto-sensing assembly 508 also functions as a conductor of current that is eventually input, as described below, to the micro-controller 512. As further illustrated in FIG. 15A, the voltage regulator 506 may use the 15 V output voltage from the voltage dropping circuit 504 to generate the voltage V3, which may be, for example, 3.3 V. The voltage V3 may be used by various components and circuitry as described below. In this embodiment, the voltage regulator 506 may be implemented by using one of many suitable integrated voltage regulators, such as the L78L33ACZ voltage regulator available from STMicroelectronics. However, in alternate embodiments, other similar voltage regulators may be used.

FIG. 15B illustrates an exemplary implementation of the micro-controller 512. The micro-controller 512 may receive the voltage V3 from the voltage regulator 506. The micro-controller 512 may be used to control and/or monitor various aspects of the control circuit 500 such as, for example, sensing and controlling temperature and controlling the voltage input to the stator windings 32. In this embodiment, the micro-controller 512 may be implemented by using one of many suitable micro-controllers, such as the Z8F042ASJ020EG micro-controller available from Zilog®, Inc. However, in alternate embodiments, other similar micro-controllers may be used. FIG. 15B also illustrates a pulse generator 572 coupled to the micro-controller 512. The pulse generator may be implemented using various methods such as, for example, a voltage controlled crystal oscillator.

Figure 15C:
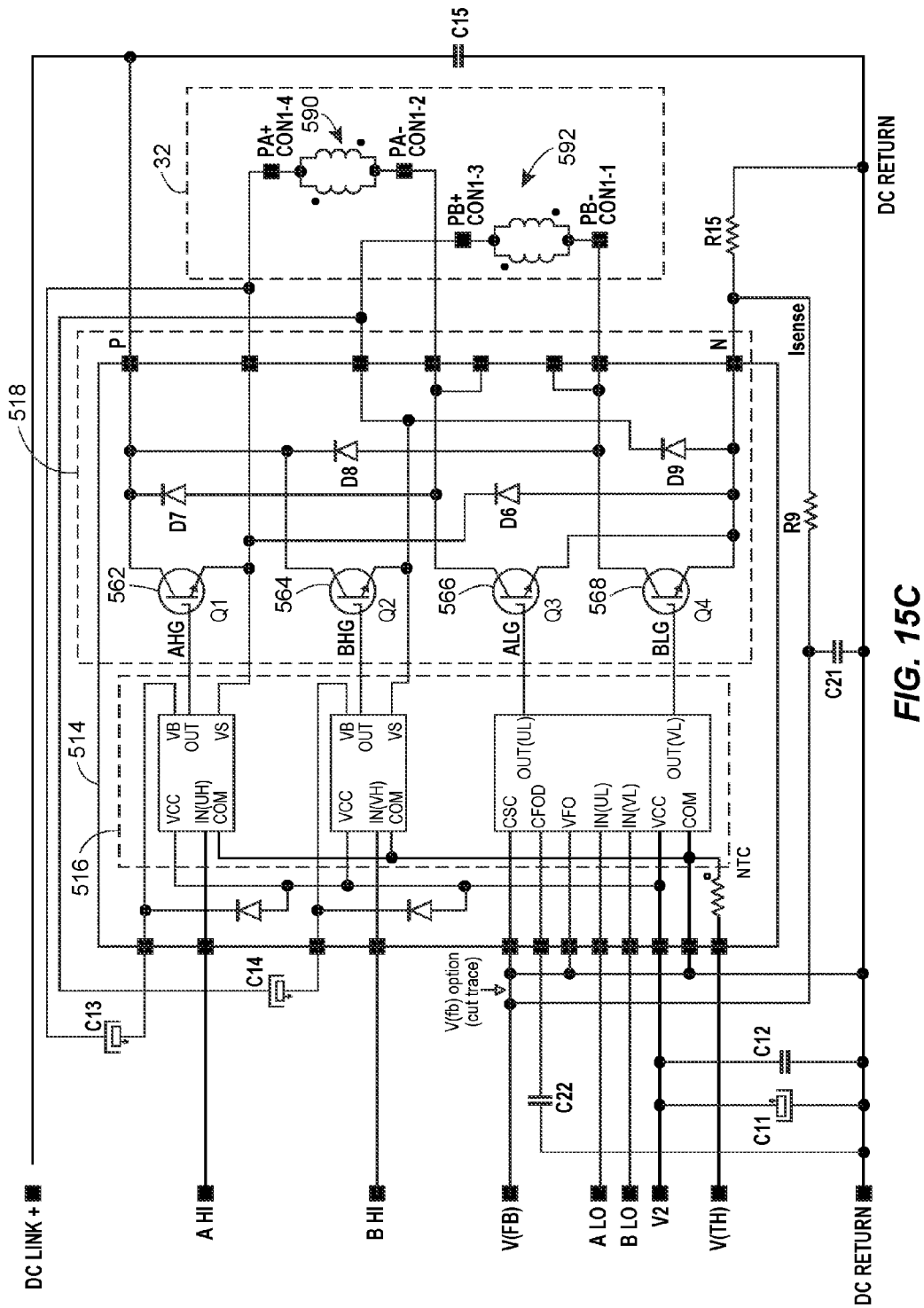

The micro-controller 512 may be used to control the voltage input to the stator windings 32 via a power module, such as the power module 514. An exemplary implementation of the power module 514 is illustrated in FIG. 15C, including exemplary implementations of the switching device driver 516 and the switching device 518. Although the power module 514 may be described herein as a single device with various components, one of ordinary skill will understand that the power module 514 need not include components which are combined into one device, and may alternatively be implemented using individual circuit devices.

The power module 514 may include the switching device driver 516 and the switching device 518. The switching device 518 may include individual switches 562-568. As described above, the individual switches 562-568 may be any of the generally known electronic switching mechanisms, such as FETs, MOSFETs, other transistors, etc. FIG. 15C illustrates an implementation of the control circuit 500 wherein the individual switches 562-568 are implemented by IGBTs. In this embodiment, the power module 514 may be implemented by using one of many suitable integrated power modules, such as the FCAS30DN60BB power module available from Fairchild Semiconductor Incorporated. However, in alternate embodiments, other similar power modules may be used. The IGBTs 562-568 control the current passing through a first phase 590, including the stator windings 32 disposed on a first subset of the plurality of stator poles 30 (e.g., the stator poles 30a and 30c), and a second phase 592, including the stator windings 32 disposed on a second subset of the plurality of stator poles 30 (e.g., the stator poles 30b and 30d), in an embodiment. The IGBTs 562 and 564 are electrically coupled to the high voltage ends of the first phase 590 and the second phase 592, respectively, and are known as the high side IGBTs. The IGBTs 566 and 568 are electrically coupled to the low voltage ends of the first phase 590 and the second phase 592, respectively, and are known as the low side IGBTs. The IGBTs 562-568 receive their respective control input signals AHG, BHG, ALG, and BLG from the switching device driver 516. More particularly, the switching device driver 516 generates the high side output AHG to drive the high side IGBT 562 coupled to the first phase 590, and generates the low side output ALG to drive the low side IGBT 566 coupled to the first phase 590. The switching device driver 516 also generates the high side output BHG to drive the high side IGBT 564 coupled to the second phase 592, and generates the low side output BLG to drive the low side IGBT 568 coupled to the second phase 592.

In an implementation of the control circuit 500, the turning on and off of the IGBTs 562-568 is controlled in a manner so as to allow sufficient time to drain the current generated in the stator windings 32 due to magnetic collapse of the stator windings 32. For example, for the first phase 590, instead of turning off the IGBTs 562 and 566 simultaneously, when the IGBT 562 is turned off, the IGBT 566 is kept on for a time period sufficient to allow dumping of the magnetic collapse induced current of the first phase 590 through the IGBT 566 to ground. Similarly, for the second phase 592, instead of turning off the IGBTs 564 and 568 simultaneously, when the IGBT 564 is turned off, the IGBT 568 is kept on for a time period sufficient to allow dumping of the magnetic collapse induced current of the second phase 592 through the IGBT 568 to ground.

Figure 15D:
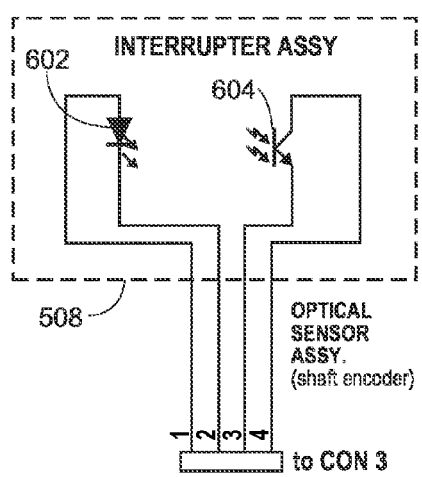

FIG. 15D illustrates an exemplary implementation of the opto-sensing assembly 508. In some embodiments, the opto-sensing assembly 508 may be implemented by a conventional optical sensor assembly, such as Honeywell P/N HOA1887-011 from Honeywell, Inc., or Optek P/N OPB830W11 from Optek, Inc. In other embodiments, instead of utilizing an "all-in-one" injection molded photosensor system, the opto-sensing assembly 508 may be implemented by a more cost-effective alternative, such as by securing a stamped aperture assembly to an off-the-shelf IR emitting component and/or an off-the-shelf IR detecting component. Of course, other embodiments of the opto-sensing assembly 508 may also be possible and may be used in conjunction with the control circuit 500. The opto-sensing assembly 508 may connect into the control circuit 500 at CON3 of FIG. 15B.

As shown in FIG. 15D, the opto-sensing assembly 508 may include a light emitting diode (LED) 602 and a silicon photo-transistor 604, where the LED 602 receives a DC output voltage from the voltage dropping circuit 504. The LED 602 and the photo-transistor 604 are placed on the opposite sides of the slotted disk 71, which is attached to the rotor 16 and therefore rotates at the speed of the rotor 16.

Figure 16:
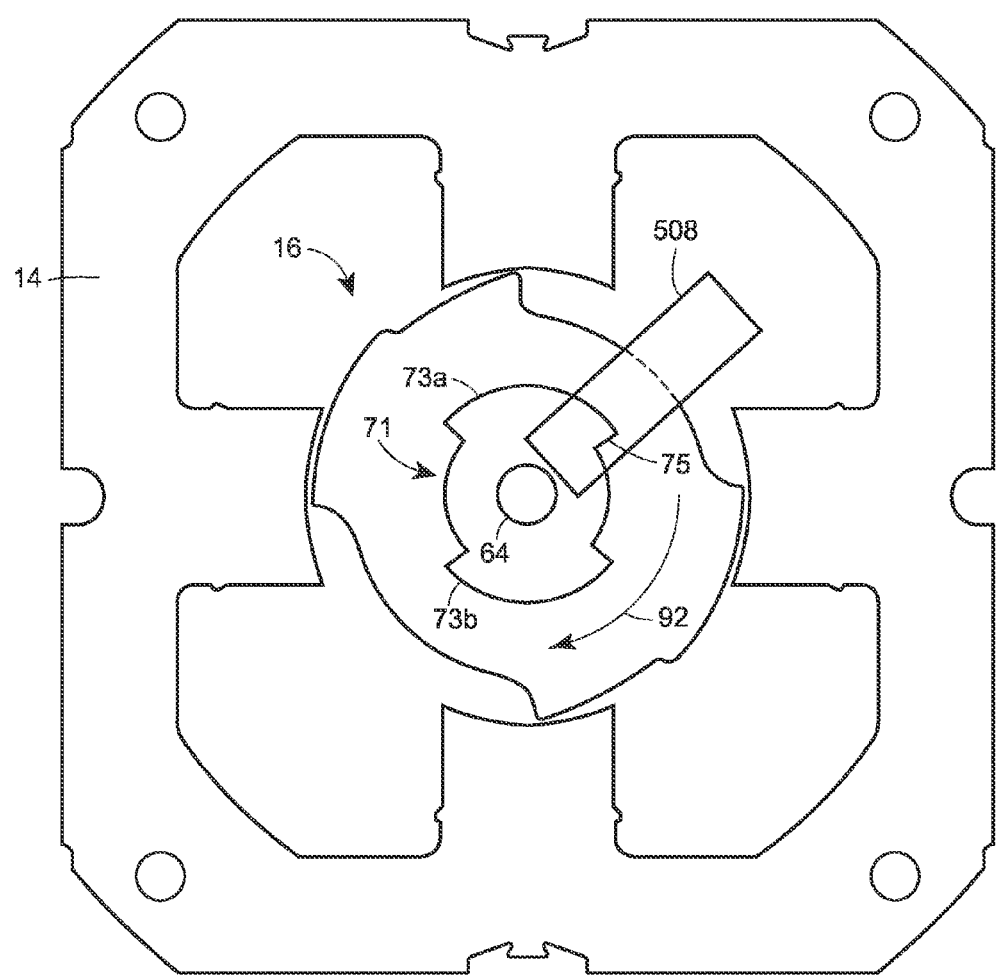
FIG. 16 is a cross-sectional view of the slotted disk of the motor shown in FIG. 2.

FIG. 16 illustrates an exemplary implementation of the slotted disk 71. The slotted disk 71 may be rotatable with the rotor 16 in the direction of arrow 92. The slotted disk 71 may include a plurality of equally spaced lobes 73a and 73b each corresponding to a respective pole of the rotor 16. Each time an edge of one of the lobes 73a and 73b, such as edge 75, passes between the LED 602 and the photo-transistor 604, the opto-sensing assembly 508 is triggered, i.e., the rotor position signal generated by the photo-transistor 604 changes from one level or state to another level or state.

The rotor position signal output from the photo-transistor 604 is input to the micro-controller 512. The micro-controller 512 determines the time period for each rotation or partial rotation of the rotor 16, as discussed below, based on the rotor position signal output from the photo-transistor 604, and calculates the speed of the rotor 16 based on the determined period. For example, if the rotor 16 has two poles, the micro-controller 512 may determine the period of each partial rotation of the rotor based on the time between two occurrences of a particular level or state of the rotor position signal. In some embodiments, each time one of the rotor poles rotates past the opto-sensing assembly 508, the rotor position signal changes levels or states two times, i.e., once for each edge of the one of the lobes 73a or 73b which corresponds to the pole rotating past the opto-sensing assembly 508. Thus, in some embodiments, after a rotor pole rotates past the opto-sensing assembly 508, the rotor position signal will be at the same level or state that the rotor position signal was at before the rotor pole rotated past the opto-sensing assembly 508. Calculation of the speed of a rotor using a time period for each rotation of the rotor is conventional. Consequently, calculation of the speed of the rotor 16 is not further described.

Figure 15E:
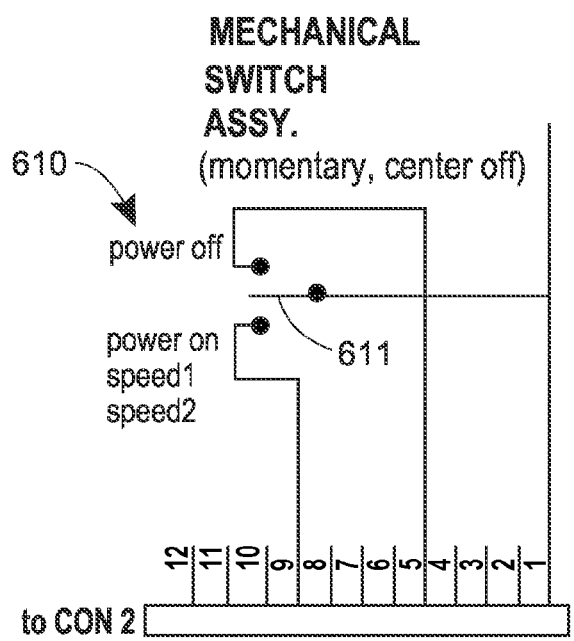

FIG. 15E illustrates a mechanical switch assembly 610. The mechanical switch assembly 610 includes a mechanical switch 611 which may be operated by a user or selected via other means. The mechanical switch 611 may be in a power off mode or a power on mode. As shown in FIG. 15E, while the mechanical switch 611 is in the power on mode, two speed settings are possible. Although the mechanical switch assembly 610 illustrated in FIG. 15E shows only two speed settings, one of ordinary skill in the art will understand that alternative implementations including one speed setting or more than two speed settings are possible. For example, the techniques described herein may be used in conjunction with various embodiments of a system and method of controlling the speed of a motor, including embodiments with multiple speed settings, such as those disclosed in U.S. Provisional Patent Application No. 61/442,598, entitled "SYSTEM AND METHOD OF CONTROLLING THE SPEED OF A MOTOR BASED ON DWELL," filed on Feb. 14, 2011, the entire disclosure of which is hereby incorporated by reference herein.

Figure 15F:
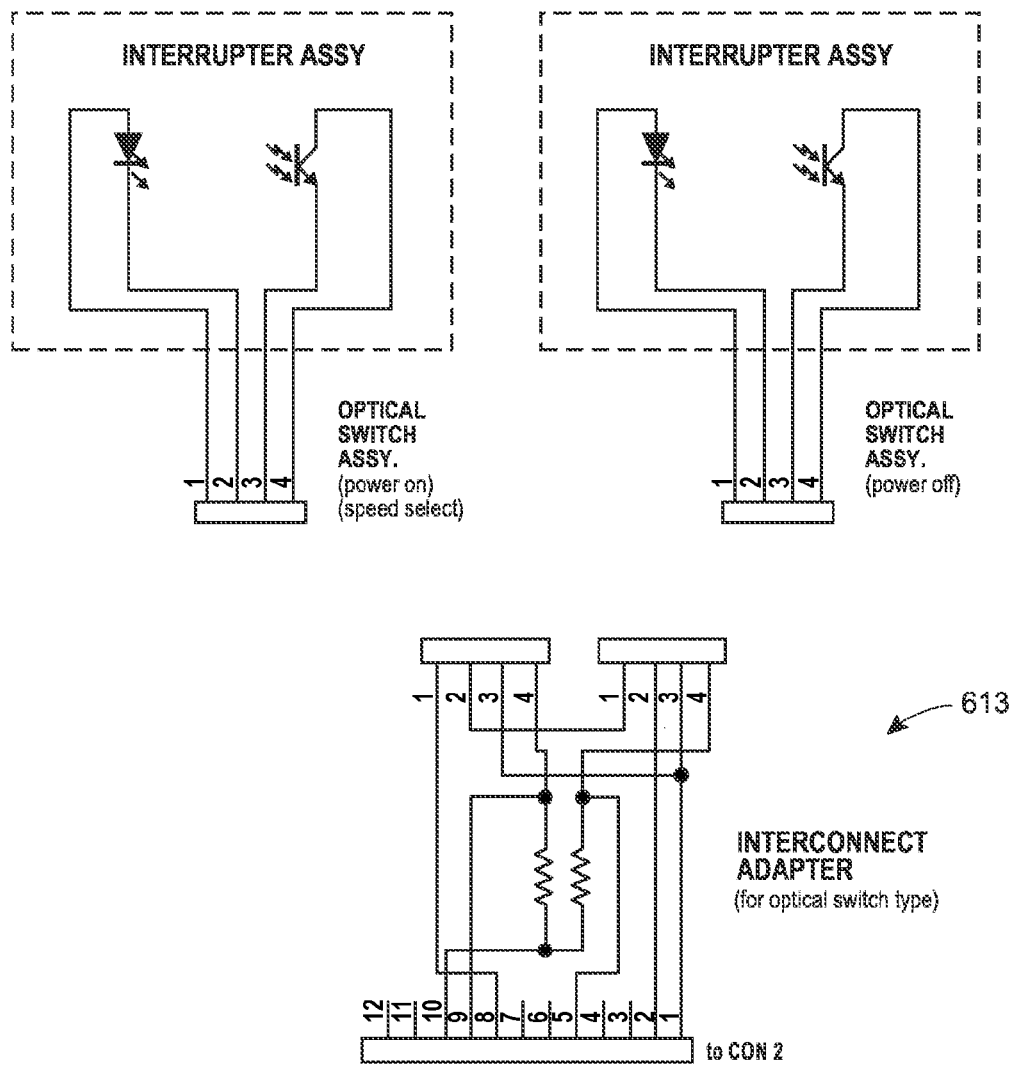

In another embodiment, an optical switch assembly may be used, such as the optical switch assembly 613 illustrated in FIG. 15F. A signal indicative of, for example, the speed setting from the mechanical switch assembly 610 or the optical switch assembly 613 may be input to the micro-controller 512.

Figure 15G:
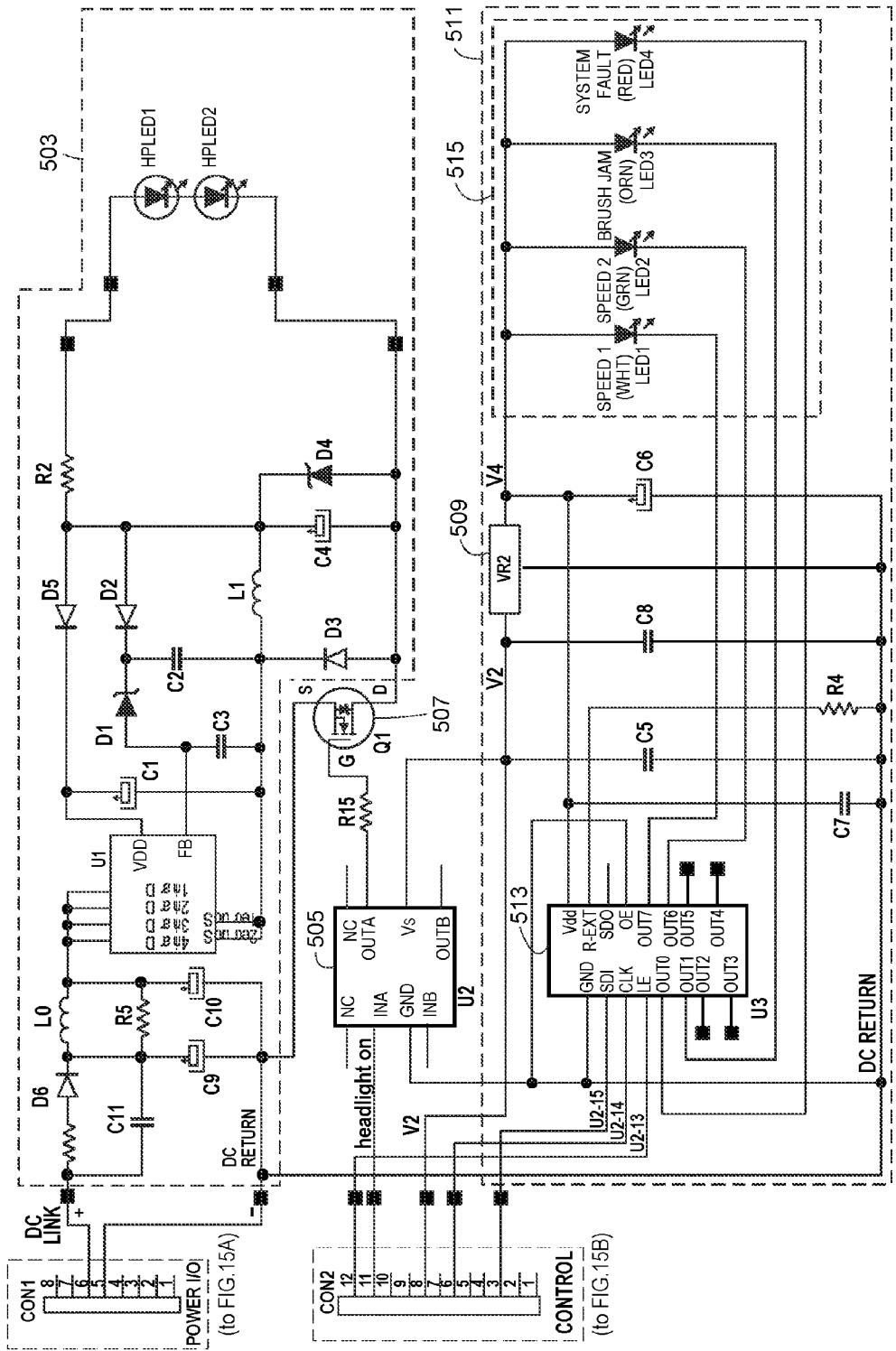

FIG. 15G illustrates circuitry that may be used to control other aspects of the control circuit 500. In particular, FIG. 15G illustrates example implementations of the headlight assembly driver 505, the headlight assembly switching device 507, and the headlight assembly 503. The headlight assembly driver 505 may receive power from the voltage dropping circuit 504. The headlight assembly driver 505 may drive the headlight assembly switching device 507. In this embodiment, the headlight assembly driver 505 may be implemented by using one of many suitable integrated driver circuits, such as the IR4427S driver available from International Rectifier. However, in alternate embodiments, other similar drivers may be used. The headlight assembly switching device 507 may be used to control the headlight assembly 503. The headlight assembly 503 may, for example, illuminate an area external to an appliance utilizing the motor 10, such as a vacuum cleaner. The headlight assembly 503 may be implemented via any of a number of light emitting devices such as LEDs, light bulbs, etc. The headlight assembly 503 may connect into the control circuit 500 at CON1 of FIG. 15A.

FIG. 15G also illustrates an exemplary implementation of the LED readout system 511, including exemplary implementations of the LED driver 513 and the LED array 515, as well as an exemplary implementation of the second voltage regulator 509. The LED readout system 511 may connect into the control circuit 500 at CON2 of FIG. 15B. The LED readout system 511 may be used, for example, to indicate various modes or fault conditions associated with the motor 10 or an appliance including the motor 10, such as a vacuum cleaner. For example, the LED readout system 511 may indicate whether the motor 10 is operating at one speed versus another speed. In one embodiment, the LED readout system 511 may indicate whether the motor 10 is operating according to a first speed setting or a second speed setting. In another example, the LED readout system 511 may indicate the occurrence of a system fault associated with the vacuum cleaner, or the occurrence of a brush jam of the vacuum cleaner. In order to control the display of the LED readout system 511, the second voltage regulator 509 may provide a voltage, such as 5 V DC or another suitable voltage, to the LED driver 513 and the LED array 515. The LED array 515 may be used to indicate one of the various modes or fault conditions associated with the vacuum cleaner. In some embodiments, the LED readout system 511 may be implemented on a printed circuit board (PCB). In one embodiment, the LED driver 513 may be implemented by using one of many suitable integrated LED drivers, such as the STPO8DP05MTR LED driver available from STMicroelectronics. However, in alternate embodiments, other similar LED drivers may be used. Additionally, in one embodiment, the second voltage regulator 509 may be implemented by using one of many suitable integrated voltage regulators, such as a suitable one of the L78L00 series of voltage regulators available from STMicroelectronics. However, in alternate embodiments, other similar voltage regulators may be used.

Of course, the drive assembly 18 and control circuit 500 are not limited to the embodiments described herein. Other embodiments are possible and may be used in conjunction with the present disclosure.

Operation of the Motor Code

Conventional switched reluctance motors utilizing a micro-controller to control the commutation of power provided to the stator windings perform the same start-up routine whenever power to the circuit is turned on. However, if the power to the motor is turned off when the rotor is rotating at a high rate of speed and then quickly cycled back on (i.e., rapid cycling), using the same start-up routine often causes damage to occur to the electrical components in the motor. Typically, it is the IGBTs in the circuit that are most susceptible of damage if the motor is not allowed to coast for a period of time until the rotational speed falls below a threshold speed. A running re-start routine is described below to detect such a rapid cycling of power and to allow the rotor to coast until the rotation speed falls below a threshold speed in order to prevent damaging the IGBTs.

As previously discussed, switched reluctance motor operation is based on a tendency of the rotor 16 to move to a position where an inductance of an energized phase of the stator winding(s) 32 is maximized. In other words, the rotor 16 will tend to move toward a position where the magnetic circuit is most complete. The rotor 16 has no commutator and no windings and is simply a stack of steel laminations with a plurality of opposed pole faces. It is however, necessary to know the rotor's 16 position in order to sequentially energize phases of the stator windings 32 with switched direct current (DC) to produce rotation and torque.

For proper operation of the motor 10, switching should be correctly synchronized to the angle of rotation of the rotor 16. The performance of a switched reluctance motor depends in part, on the accurate timing of phase energization with respect to rotor position. Detection of rotor positions in the present embodiment is sensed using a rotor position sensor in the form of the opto-sensing assembly or optical interrupter 508.

One manner in which an exemplary system may operate is described below in connection with FIGS. 17A-17E which represent a number of portions or routines of one or more computer programs. The majority of the software utilized to implement the routines is stored in one or more of the memories in the micro-controller 512, and may be written at any high level language such as C, C++, C#, Java or the like, or any low-level assembly or machine language. By storing the computer program portions or computer-executable instructions therein, those portions of the memories are physically and/or structurally configured in accordance with the stored program portions or instructions. Parts of the software, however, may be stored and run in a separate memory location. As the precise location where the steps are executed can be varied without departing from the scope of the invention, the following figures do not address the machine performing an identified function.

FIGS. 17A-17E are parts of a flowchart of an example method 700 describing some of the steps used to synchronize the switching or commutation of the power provided to the stator windings 32. Instructions for some, or all, of the steps shown of the method 700 may be stored in the memory of the micro-controller 512. Embodiments of the method 700 are also disclosed in U.S. Provisional Patent Application No. 61/318,186, entitled "Switched Reluctance Motor," filed on Mar. 26, 2010, the entire disclosure of which is incorporated by reference herein.

Figure 17A:
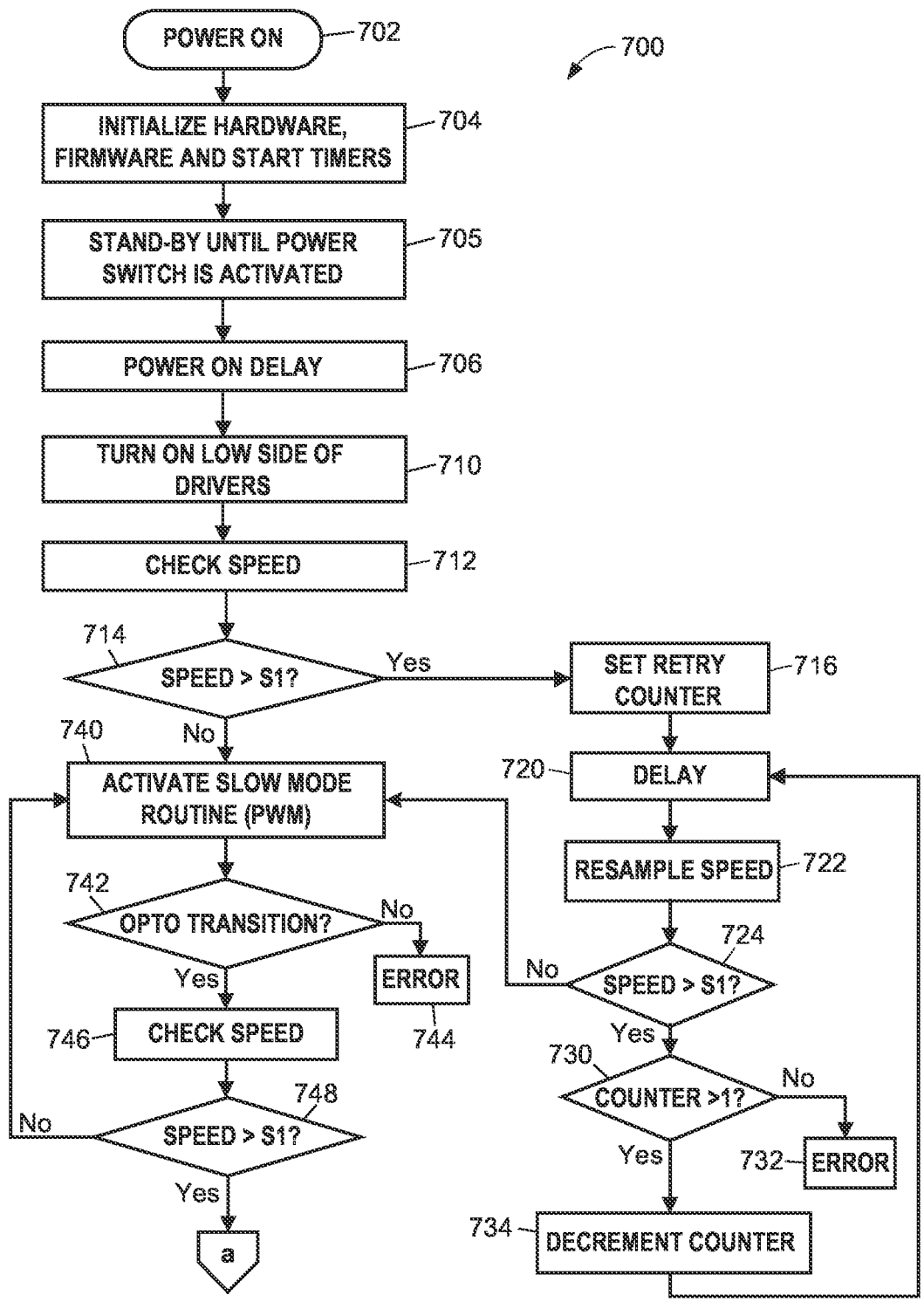
FIGS. 17A-17E illustrate an embodiment of a method used to synchronize the switching or commutation of the power provided to the stator windings.

Referring to FIG. 17A, the method 700 may begin when power is provided to the control circuit (block 702). This begins the initialization phase, and includes initializing the hardware, firmware, and start timers (block 704). Specifically, the initialization includes a series of inline initialization instructions that are executed every power on. The initialization may be further broken down into hardware initialization, variable initialization, stand-by and power on delay.

Upon power on, program execution begins within the micro-controller 512 at a specific memory location. In essence, the hardware initialization includes a series of instructions that configure the micro-controller 512 by assigning and configuring I/O, locating the processor stack, configuring the number of interrupts, and starting a plurality of period timers. The variable initialization includes installing sane default values to a number of variables, one of which is a speed dependant correction variable.

Figure 17B:
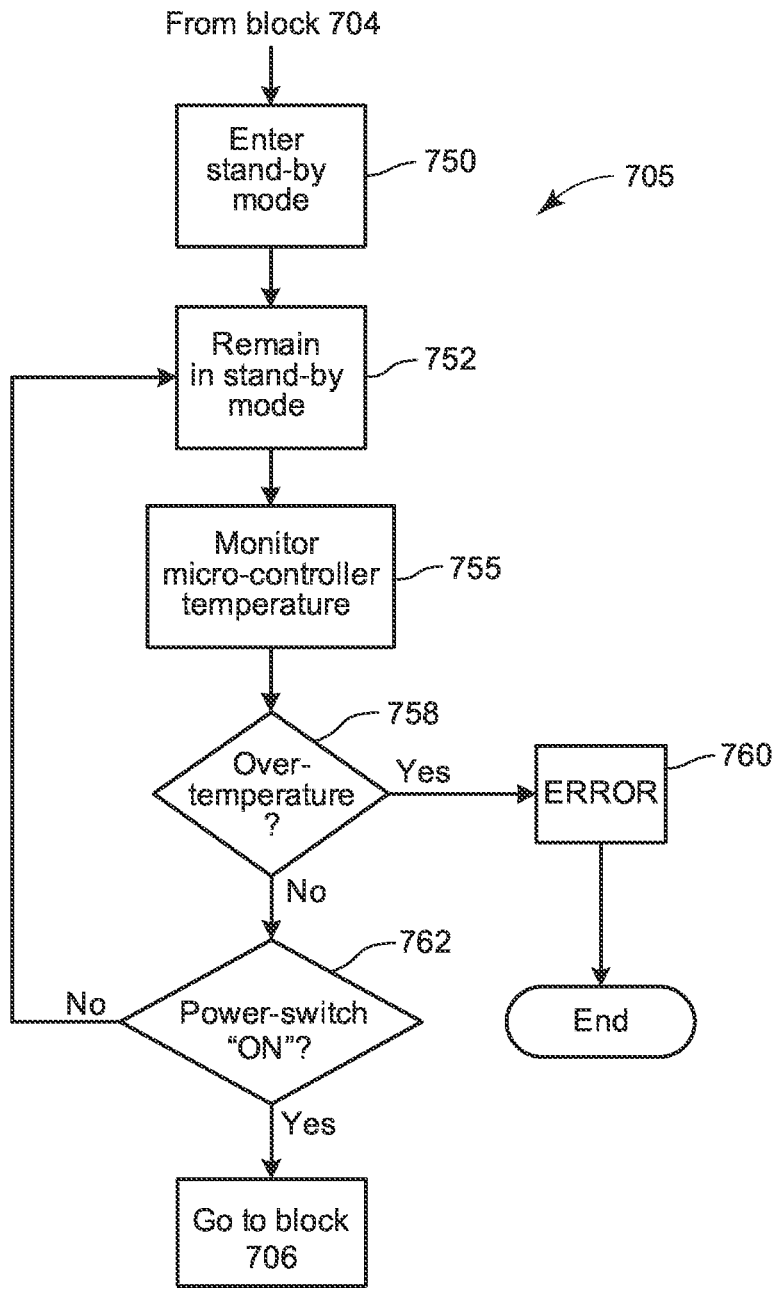

The program may remain in a stand-by mode until a user-actuated power switch is activated (block 705). The function described by the block 705 is discussed in further detail with respect to FIG. 17B. In FIG. 17B, the program may enter 750 and may remain 752 in a stand-by mode. While in the stand-by mode, the temperature of the micro-controller 512 may be continually monitored 755. This monitoring of the micro-controller temperature 755 may be a redundant safety measure as typically, no appreciable current should be present at the micro-controller. It may be detected whether the micro-controller temperature exceeds a pre-determined level (block 758). If the micro-controller temperature exceeds the pre-determined level, an error or fault may be generated 760 and the operation of the motor may cease. In some embodiments, the error or fault may be logged and/or an LED (Light Emitting Diode) within the LED array 515 indicating the fault may be illuminated. In some embodiments, a reboot of the micro-controller 512 may be required to reset the detected fault condition (block 758).

In some embodiments, one or both of the voltage regulators 506 or 509 have internal temperature monitoring capabilities, in addition to or instead of the monitoring of the temperature of the micro-controller 512 as described above. For example, one or both of the voltage regulators 506 or 509 may include a thermal protection device (not shown) that measures the temperature of the voltage regulator 506 or 509 and shuts down its output voltage whenever the temperature reaches a threshold level, such as 150° C.

In other embodiments, temperature monitoring is also or alternatively performed using a heat sink (not shown). In one embodiment, the heat sink may be disposed parallel to a printed circuit board on which the control circuit 500 is implemented. The heat sink may be suitably coupled to the micro-controller 512 such that the micro-controller 512 may implement temperature monitoring based on, for example, the temperature of the environment in which the heat sink is disposed.

If an over-temperature is not detected (block 758), the control code may remain in stand-by 752 until it is determined that the user power switch is activated (block 762). For example, the control code may receive a signal indicating that the user has activated the power switch. Upon activation of the power switch the code may return to the block 706 of FIG. 17A to begin motor control and acceleration.

Returning to FIG. 17A, there may be a 100 mS power on delay which may give a number of power supply capacitors time to charge most of the way before the switching device driver 516 is turned on (block 706). This may prevent the switching device driver 516 from dragging down the low voltage power supply during start up. During this time delay, the low side outputs of the switching device driver 516 may be turned on to charge the bootstrap capacitors (block 710).

In operation, the micro-controller 512 may utilize different speed routines, for example, a slow mode and a fast mode. However, immediately after initialization, the micro-controller 512 will determine a rotational speed of the rotor 16 by polling the opto-sensing assembly 508 in order to determine if the running re-start routine is needed before activating the slow mode (block 712). If it is determined (block 714) that the rotor speed is greater than a pre-determined value S1, such as for example, 9191 RPM, the method will jump to a running re-start mode which is utilized to prevent damage to the IGBTs 562-568 after a rapid cycling of current provided to the motor 10. The rapid cycling of power to motor 10 is essentially a quick off/on while the motor 10 is already spinning. Cycling the power above certain speeds may confuse the slow mode routine (described below) and possibly blow one or more of the IGBTs 562-568. Therefore, after a rapid cycling of power, the running re-start routine may be used to initiate a delay that allows the rotational speed of the rotor 16 to decrease to a point where the firing angles, as calculated by the micro-controller 512, are fixed.

From a running re-start routine, if it is determined (block 714) after power on that the speed is greater than 9191 RPM, a retry counter is set (block 716), for example. It should be noted that the retry counter may alternatively be set upon initialization, or may be set at another point in the running re-start routine. A pre-determined time delay, such as 500 ms, may then be initiated (block 720). The rotational speed of the rotor 16 is then re-sampled (block 722). If it is determined (block 724) that the rotational speed of the rotor 16 is still greater than the pre-determined threshold S1, the routine will then check (block 730) to determine the value of the retry counter.

If it is determined (block 730) that the retry counter is not greater than 1, then an error may be generated (block 732) and the system may be shut down. In other words, this would occur when the retry counter has counted down consecutively from 20 to 1. This would indicate that a pre-determined time period would have passed. If it is determined (block 730) that the retry counter is greater than 1, then the retry counter is decremented (block 734) and the routine returns to the function described by the block 720 where another delay is initiated.

If it is determined (block 724) that the rotational speed of the rotor 16 is within a first range, such as being less than the threshold S1, then the routine will jump to activate a first control mode, such as a slow mode routine (block 740). In other words, in the disclosed embodiment, the rotational speed of the rotor 16 continues to be re-sampled for a pre-determined time if the re-sampled rotational speed continues to exceed the threshold S1. Those of ordinary skill in the art will readily appreciate that alternative methods of checking to ensure that the rotational speed of the rotor 16 has decreased to a safe level before jumping to the slow mode routine can be implemented. For example, a longer delay may be implemented in which the need to utilize the retry counter may be eliminated. A variety of other techniques may also be utilized.

When the slow mode routine is activated (block 740), the micro-controller 512 provides pulse width modulation (PWM) to whichever phase of stator windings 32 is ahead of the rotor poles 62 during start up to avoid large current spikes as the rotor 16 comes up to speed. The rotor position is typically known at startup from the state of the signal from the opto-sensing assembly 508. Effectively, each current pulse supplied to the stator windings 32 is chopped into many short (duration) current pulses until the rotor speed reaches a pre-determined speed. At that point, full pulses are applied to the stator windings 32. Transitions of the signal from the opto-sensing assembly 508 (e.g., transitions of the signal from a state corresponding to a logical high value to a state corresponding to a logical low value, or vice versa) may be polled, triple debounced, and disabled for a minimum period of time after a previous transition in order to reduce the chances of noise on the output signal.

In slow mode, the current input is duty cycled to limit the maximum IGBT on time in all cases. Additionally, there are two unique commutation states that reflect the present state of the signal from the opto-sensing assembly 508. At any time during the slow-mode routine 740-748, if a power-off indication is received (e.g., a user-actuated power-off switch is activated), the code may return to stand-by mode (block 750 of FIG. 17B).

Figure 18:
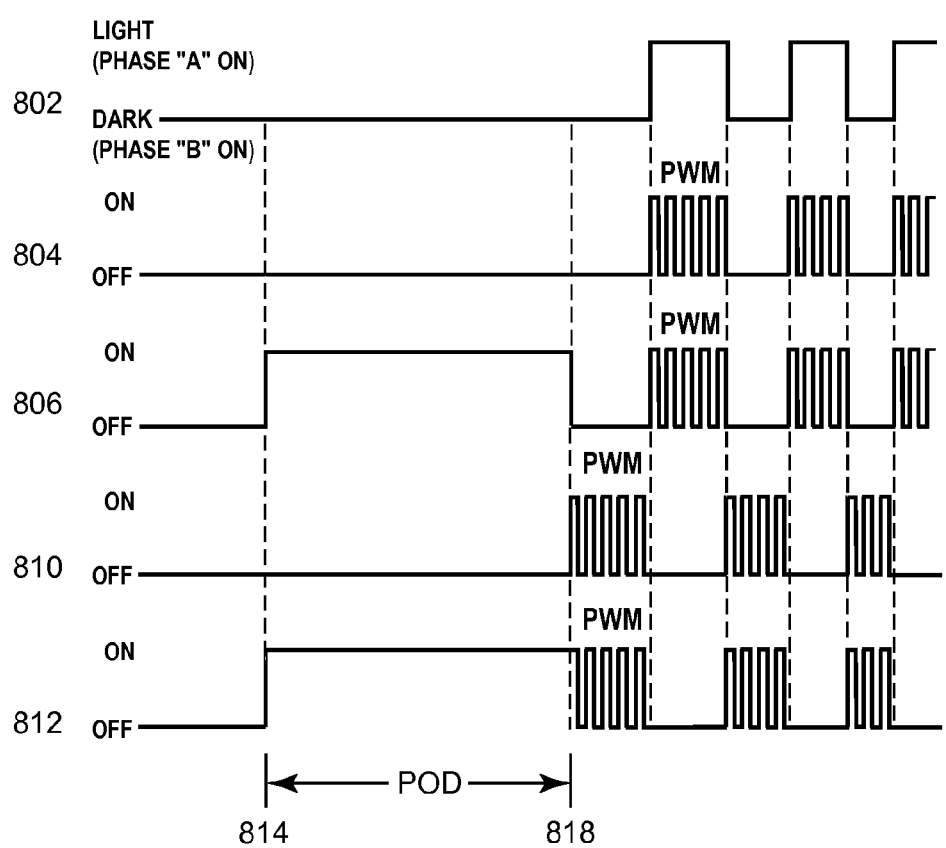
FIG. 18 illustrates a start-up wave form in a slow mode for the first 1.5 rotor revolutions for the switched reluctance motor.

FIG. 18 illustrates a possible start-up wave form in a slow mode for the first 1.5 rotor revolutions for some embodiments of the motor. The wave form 802 corresponds to a signal received from the opto-sensing assembly 508. For example, the wave form 802 corresponding to the signal received from the opto-sensing assembly 508 may be a square or rectangular wave generated by the micro-controller 512. More particularly, while the signal received from the opto-sensing assembly 508 may not be in the form of a square or rectangular wave, one or more software routines in the micro-controller 512 may recognize transitions in this signal as corresponding to transitions from a logical high value to a logical low value, or vice versa. The micro-controller 512 may then generate the corresponding square or rectangular waveform accordingly. Example routines for recognizing such transitions are generally described in U.S. Pat. No. 7,050,929 to Norell et al., entitled "SYSTEM AND METHOD OF ENSURING LEGITIMACY OF A SENSOR SIGNAL RECEIVED FROM A ROTOR POSITION SENSOR IN A MOTOR," the entire disclosure of which is hereby incorporated by reference.

The wave form 804 illustrates the high side of phase 'A' and the wave form 806 illustrates the low side of phase 'A'. The wave form 810 illustrates the high side of phase 'B' and the wave form 812 illustrates the low side of phase 'B'. It is further illustrated that at the point 814, the power to the motor 10 is switched on. The pre-determined power on delay (block 706) in FIG. 17A is shown between times 814 and 818. As seen from the wave forms, at the point 814 when the power is switched on, the low side of both phase 'A' and phase 'B' are turned on to charge the bootstrap capacitors. It should be noted that, for this embodiment, only when both the low and the high side of a given phase are on is full current to the respective stator windings supplied.

Figure 19:
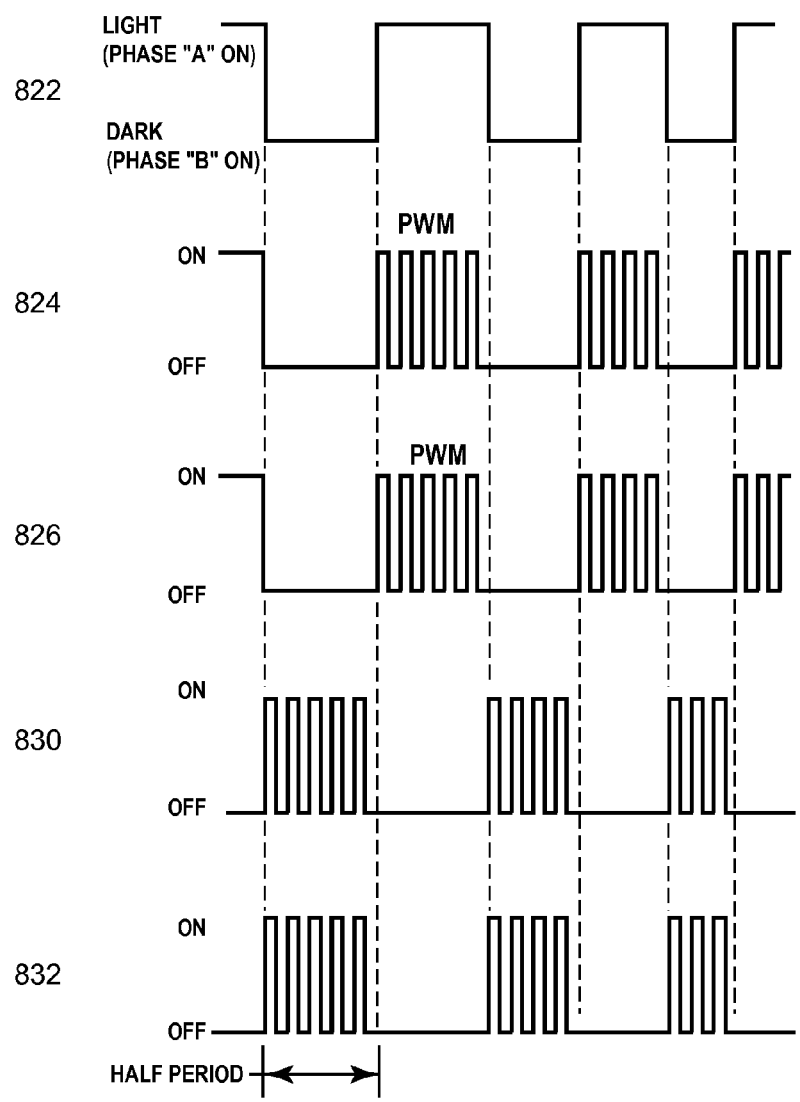
FIG. 19 also illustrates a number of wave forms in the slow mode or fixed-pulse width PWM routine.

FIG. 19 also illustrates a number of wave forms in the slow mode routine. Similar to FIG. 18, the wave form 822 corresponds to the output from the opto-sensing assembly 508. The wave form 824 illustrates the high side of phase 'A' and the wave form 826 illustrates the low side of phase 'A'. The wave form 830 illustrates the high side of phase 'B', and the wave form 832 illustrates the low side of phase 'B'. FIG. 19 also illustrates that when power to a phase is on, it is actually about a thirty-six percent duty pulse width modulation signal. The modulating of both the high and low side switches simultaneously is known as hard chopping. Soft chopping is the switching of one of the two sides. Hard chopping is used in the disclosed embodiment to minimize current burst at power up. It can also be seen from FIG. 19 that the period length of the wave forms decrease due to acceleration of the motor 10. As shown in FIGS. 18 and 19, power to phase 'A' may be on when the output from the opto-sensing assembly 508 is a logic high, in some embodiments.

Returning to FIG. 17A, after initiating the slow mode routine (block 740), the routine will then check to see if an optical transition has occurred (block 742). An optical transition may be detected when, for example, the signal from the opto-sensing assembly 508 changes from a logical high value to a logical low value, and/or when the signal from the opto-sensing assembly 508 changes from a logical low value to a logical high value, according to various embodiments. If no optical transition has been recorded, then an error is generated indicating a problem on start up (block 744). If it is determined (block 742) that an optical transition has occurred, the routine may check the rotational speed of the rotor 16 (block 746). If it is determined (block 748) that the rotational speed of the rotor 16 is less than the pre-determined threshold S1, the routine returns to the function described by the block 740 to continue executing the slow mode routine. However, if it is determined (block 748) that the rotational speed of the rotor 16 is within a second range, such as being greater than the pre-determined threshold S1, the routine as shown on FIG. 17A will move to activate a second control mode, such as a fast mode routine (block 770 of FIG. 17C, which is further detailed in FIG. 17D). In the disclosed embodiment, the pre-determined speed threshold S1 is approximately 9191 RPM, but other speed threshold levels may be possible. Additionally, as used herein, the terms "fast-mode," "advance," "phase advance," "phase advance acceleration," and "advance acceleration" are used interchangeably to mean an embodiment corresponding to the function described by the block 770 of FIG. 17C.

Figure 17C:
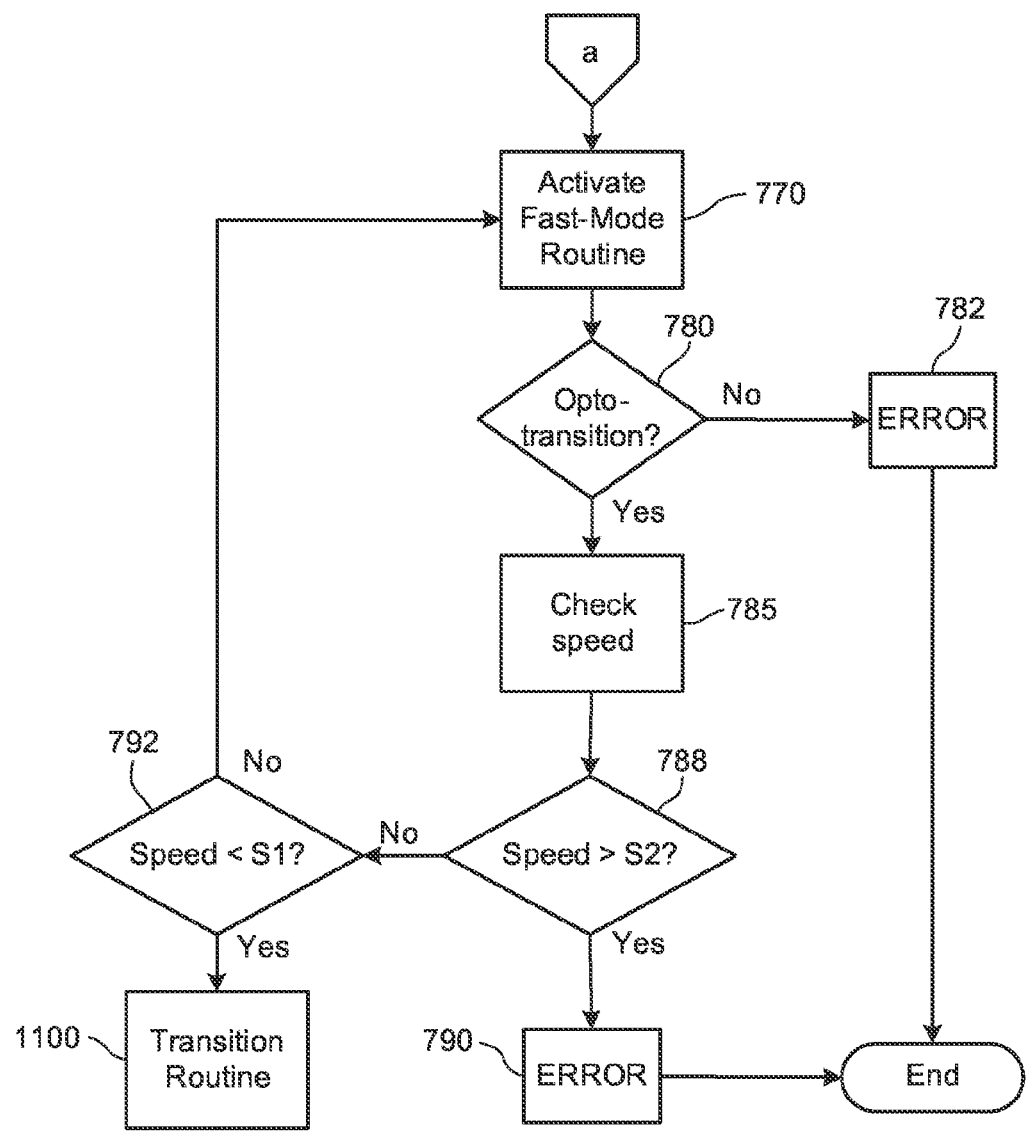

In FIG. 17C, while operating in the fast mode 770, the routine may monitor for optical transitions 780 as indicated by the opto-sensing assembly 508 corresponding to rotor movement. If an expected opto-transition is not detected (block 780), an error may be generated 782. If an expected opto-transition is detected (block 780), the speed of the motor may be checked or determined 785. If it is determined (block 788) that the speed exceeds a pre-determined threshold S2, an error may be generated 790. If it is determined (block 792) that the speed falls within acceptable limits (i.e., if the speed exceeds the threshold S1 but does not exceed the threshold S2), the fast mode routine may continue to be activated 770. For any generated error or fault (e.g., block 782 or 790), the error or fault may be logged and/or an LED (Light Emitting Diode) corresponding to the fault may be illuminated. In some embodiments, the motor may shut down or a reboot of the micro-controller 512 may be required to reset the detected fault condition. Of course, if at any time during the activated fast mode routine 770, a user-indicated power off indication is received, the control code may gracefully exit the fast mode routine 770, for example, by ceasing to produce subsequent PWM pulses at all. Additionally, if at any time the speed at 785 is determined to be less than S1 (block 792), the routine as shown in FIG. 17C will move to activate a transition routine 1100 from the fast mode (or phase-advance acceleration) routine to the slow mode (or fixed-pulse width PWM) routine. This transition routine is further detailed in FIG. 17E, and is discussed in a later section.

Figure 17D:
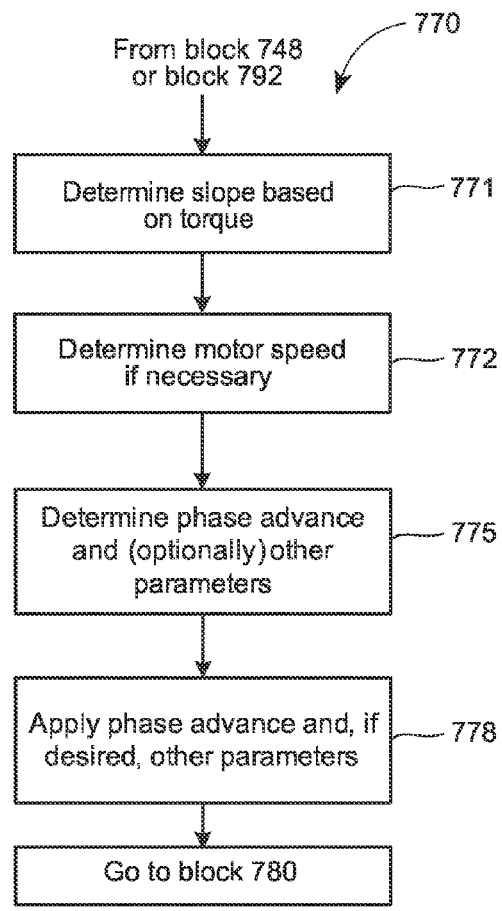

FIG. 17D illustrates in further detail the activated fast mode or phase advance routine 770 of FIG. 17C. At speeds above the speed threshold S1, the fast mode routine may utilize an electronic phase advance to optimize the torque of the motor and to facilitate a smooth acceleration to normal operating speed. In the embodiment illustrated by FIG. 17D, the fast mode routine determines electronic phase advances for subsequent PWM pulses based on torque and on a current speed of the motor.

With regard to torque, the fast mode routine may include determining a slope 771 based on a maximum torque of the motor at a lower operating load and a maximum torque of the motor (within a current limit) at a higher operating load. The slope may be determined 771, for example, by obtaining empirical maximum torque data for the motor when it is optimally configured for various operating loads, e.g., configured so that a maximum power at a given load is realized by adjusting the phase advance to an optimum level for each of the various operating loads. The empirical data may be plotted on a graph of maximum torque based on operating load or on a graph of phase advance vs. period, and the slope may be determined or estimated from the graph. In some embodiments, an empirically-determined slope may be first determined and then the slope value may be adjusted. Of course, besides empirical plots, other embodiments for determining the slope 771 based on torque may be possible.

With regard to the current motor speed, the fast mode routine may include determining the current speed of the motor 772 based on signals from the opto-sensing assembly 508. For example, the fast mode routine may determine a period of rotor revolution by determining a time between encoder/sensor falling edges (e.g., the time between two adjacent encoder/sensor 510 transitions from high to low), which may correspond to a complete revolution of the rotor for a rotor with one pole, or to a partial revolution of a rotor with more than one pole. For example, for a rotor with two rotor poles, a period may correspond to a time of a half-revolution of the rotor, and for a rotor with three poles, a period may correspond to a time of a third of a complete revolution of the rotor. In some embodiments, the speed of the motor 772 may have already been determined (e.g., block 746 or block 785).

The fast mode routine may include determining a phase advance based on the slope and the period (block 775). The phase advance may indicate an amount of time to advance a subsequent phase firing, and may be determined for every period of the rotor. In one embodiment, the phase advance may be determined by a formula:

$$\text{ADVANCE} = MLA - ((MLV - \text{PERIOD})/m)$$

where ADVANCE is the determined phase advance, MLA is a maximum load optimum advance, MLV is a maximum load speed corresponding to the MLA, PERIOD is the determined period, and m is the determined slope. The MLA and MLV may be correlated for a given load, and may be determined, for example, based on one or more data points of the empirical torque data used to determine the slope. In this example, the MLA may be a phase advance value corresponding to a particular load where the power of the motor is optimized, and the MLV may be the speed of the motor corresponding to the MLA for that particular load.

In some embodiments, the ADVANCE and the MLA may be represented in units corresponding to a timer count value, and the MLV may be represented in units of revolutions per minute. Similar to the slope m, one or both of the MLA and the MLV may be determined empirically and/or a priori. In some embodiments, one or both of the MLA and the MLV may be adjustable. The determined phase advance may be applied (block 778) to a subsequent phase firing corresponding to a subsequent period so that the subsequent phase firing occurs earlier by a time of ADVANCE. Thus, for a rotor with more than one pole, the determined phase advance may be applied to a subsequent partial revolution of the rotor.

In some embodiments, one or more additional parameters to be applied to subsequent phase firings may be determined (block 775). For example, the PERIOD and ADVANCE values may be used to determine a desired positive torque zone size (PTZ_SIZE), a phase dwell (PHASE_DWELL), a phase dwell complement (PHASE_DWELL_C), an amount of time to perform a phase advance calculation (CALC_TIME), and a dwell remainder (DWELL_REMAINDER) of a subsequent period. These parameters are described in further detail below.

With regard to the desired positive torque zone size (PTZ_SIZE), the PTZ_SIZE parameter may indicate a percentage of a physical positive torque zone. As previously discussed, as a rotor rotates between two adjacent, energized stator poles, a first angular portion may cause the rotor to move in the desired direction of rotation due to positive torque (e.g., "physical positive torque zone") and a second angular portion may influence the rotor in a direction opposite to the desired direction of rotation (e.g., "negative" or "braking" torque zone). Thus, the first angular portion or positive torque zone represents an angular portion of the rotor/stator radial relationship where if a phase of the stator is energized, a torque in the positive direction would be produced. For a switched-reluctance motor configured in conjunction with at least a portion of the disclosures herein, the actual physical positive torque zone was determined to be about 90-95% of the angle of rotation between two stator poles. Applying current to stator coils outside of the actual physical positive torque zone (e.g., during the remaining 5-10% of the angle of rotation) resulted in braking of the rotor.

The desired positive torque zone size (PTZ_SIZE) may be equivalent to the actual, physical torque zone, or the desired positive torque zone size may be determined to be a subset of the actual physical positive torque zone. In some embodiments, the PTZ_SIZE may be pre-determined. For example, if the motor has a greater maximum power than required for its application, the desired positive torque zone size PTZ_SIZE may be set to a level less than the actual physical positive torque zone. In some embodiments, different desired positive torque zone sizes may be determined for different desired speed and/or power levels of the motor. For example, for a desired HIGH speed of the motor, a corresponding desired positive torque zone size may be approximately 62% of the angle of rotation between two stator poles, and for a desired LOW speed, a corresponding desired positive torque zone size may be approximately 55%.

The actual speed of the motor may be controlled based on a dwell time (PHASE_DWELL) of each phase in an energized state. The dwell time PHASE_DWELL may correspond to the PERIOD that was previously determined (block 772) and to the desired positive torque zone size PTZ_SIZE. The dwell time may indicate an amount of time of energization for each PWM pulse. In just one possible example that includes a motor with two rotor poles and two stator pole pairs, the dwell time may be determined by taking a percentage of a half-period corresponding to the desired positive torque zone size, e.g.: PHASE_DWELL=(PERIOD/2)*PTZ_ SIZE. One of ordinary skill in the art will easily note and appreciate that a relationship exists between desired positive torque zone size, dwell time and percent duty of the motor. In particular, the desired positive torque zone size influences the dwell time and thus the percent duty of the motor.

The phase dwell complement parameter PHASE_DWELL_C may indicate an amount of time without energization for a PWM pulse. For example, in the motor with two rotor poles and two stator pole pairs, PHASE_DWELL_C may be determined by PHASE_DWELL_C=(PERIOD/2)−PHASE_DWELL. However, some finite (and usually fixed) amount of time is needed during each period to perform phase advance calculations (CALC_TIME). Thus, a dwell remainder for each period during which a subsequent phase is not energized may be determined by the equation: DWELL_REMAINDER=PHASE_DWELL−ADVANCE−CALC_TIME.

Figure 20:
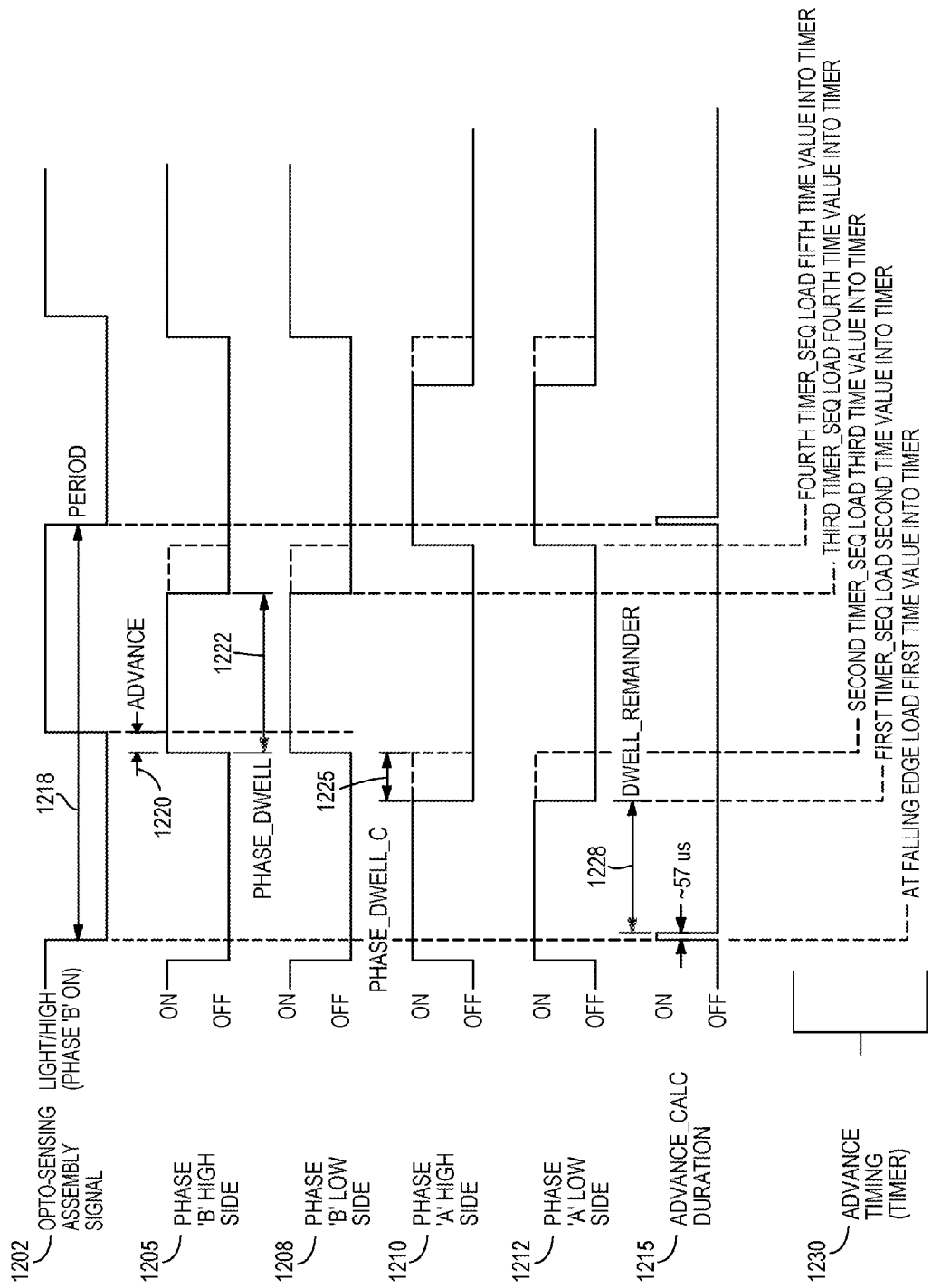
FIG. 20 illustrates wave forms in the fast mode or phase-advanced routine.
Figure 22A:
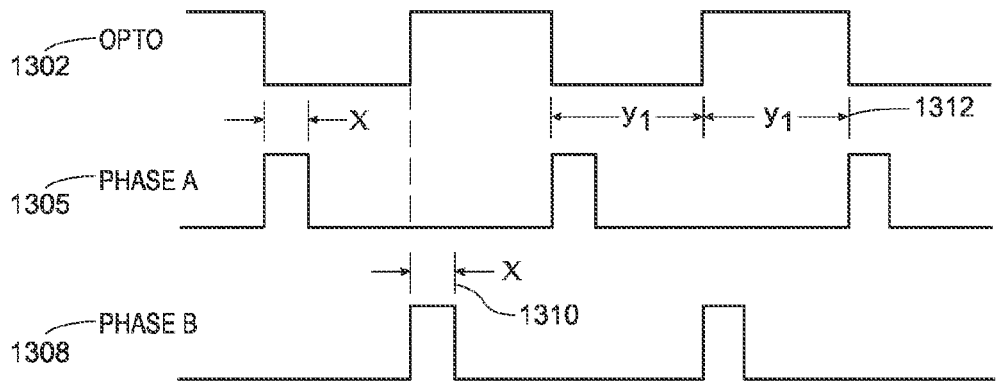
FIG. 22A illustrates a set of wave forms for an embodiment of a motor running at 8940 rpm.
Figure 22B:
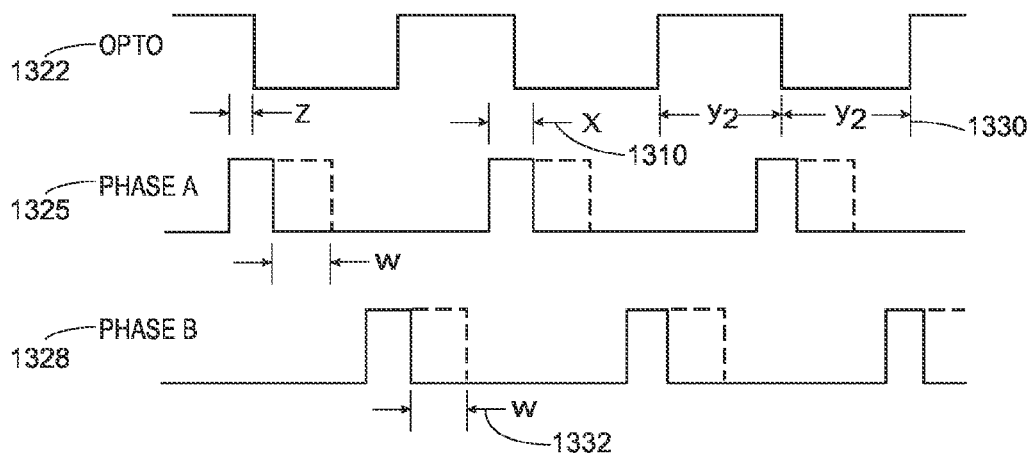
FIG. 22B illustrates a set of wave forms for the motor running at 9270 rpm.
Figure 23:
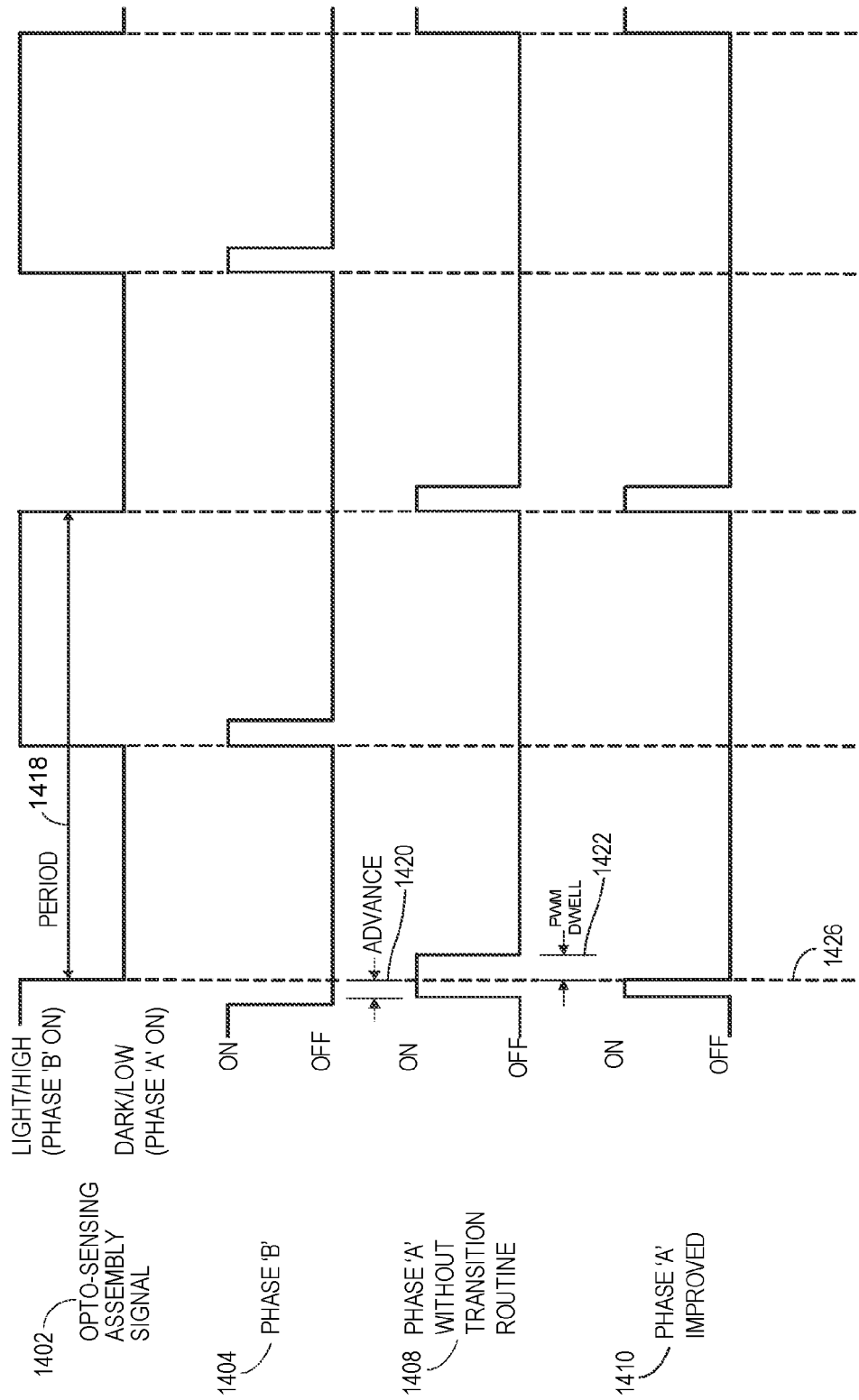
FIG. 23 illustrates wave forms during a transition routine from the fast mode or phase-advanced routine to the slow mode or fixed-pulse width PWM routine.

Wave forms illustrating an embodiment of the fast mode routine 770 of FIG. 17C are shown in FIG. 20. Wave form 1202 corresponds to the signal received from the opto-sensing assembly 508. The wave form 1205 illustrates the high side of phase 'B' and wave form 1208 illustrates the low side of phase 'B'. The wave form 1210 illustrates the high side of phase 'A' and wave form 1212 illustrates the low side of phase 'A'. FIG. 20 shows that the relationship between the output from the opto-sensing assembly 508 and the power to the phases of the motor 10 may be different in various embodiments. In particular, while FIGS. 18 and 19 show that the power to phase 'A' may be on when the output from the opto-sensing assembly 508 is a logic high, FIG. 20 shows that, in some embodiments, the power to phase 'B' may be on when the output from the opto-sensing assembly 508 is a logic high. FIGS. 22A, 22B, and 23 also show that the power to phase 'B' may be on when the output from the opto-sensing assembly 508 is a logic high.

The waveform 1215 illustrates the amount of time during each period required to perform a calculation of the advance of a subsequent period (ADVANCE_CALC). Reference 1218 illustrates a period (PERIOD) or time between falling edges indicated by the opto-sensing assembly 508. Reference 1220 illustrates a determined advance (ADVANCE) of a subsequent Phase 'B' energization. Reference 1222 illustrates the dwell time (PHASE_DWELL) of the subsequent Phase 'B' energization, reference 1225 illustrates a dwell complement (PHASE_DWELL_C), and reference 1228 illustrates a dwell remainder (DWELL_REMAINDER).

In the context of micro-controller design, an interrupt is an asynchronous event that causes an immediate transfer of user program flow from its current execution loop to an interrupt service routine (ISR). The purpose of interrupts is to provide a quick, deterministic response to an external event without the need for constant polling in the main foreground program routine. An ISR is just like a normal subroutine of processing instructions with one exception. That is, because the ISR may be called or invoked at almost any time, independent of the current foreground execution loop, special care should be take to ensure it does not adversely affect the main program.

Figure 21:
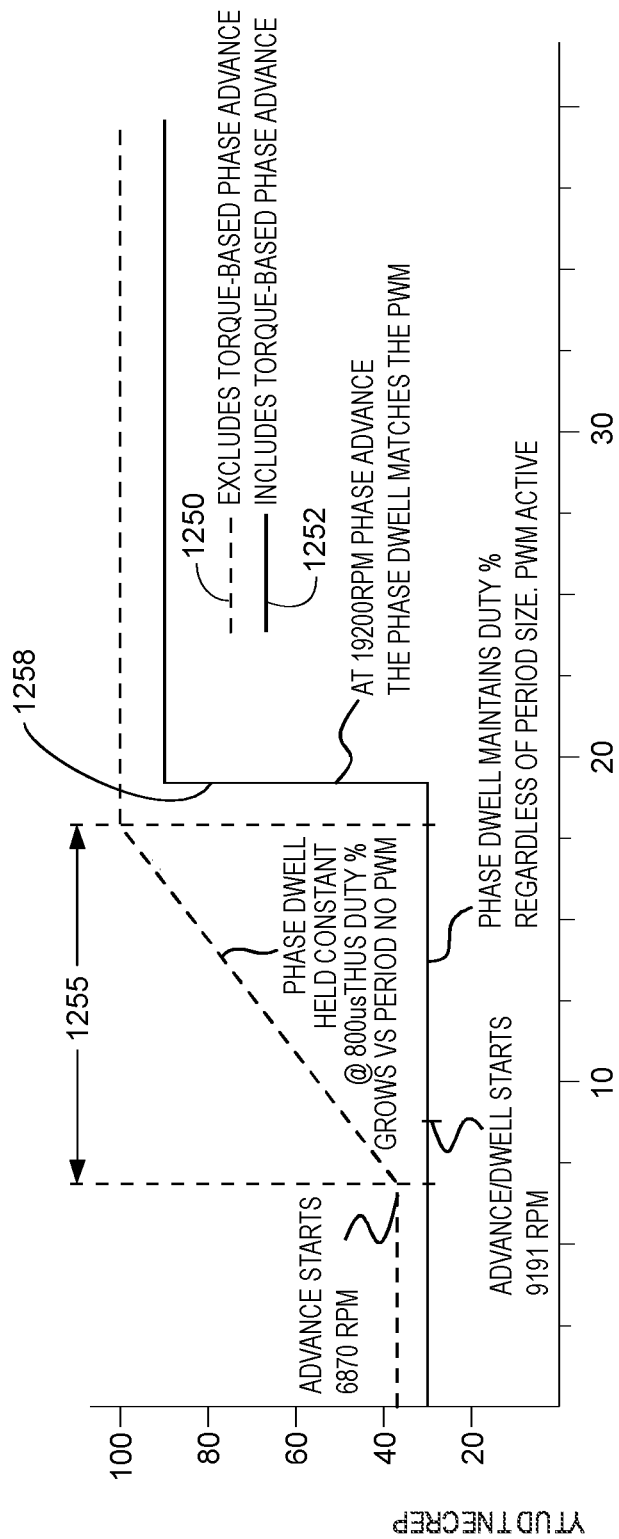
FIG. 21 is a graph of observed data for percent duty versus motor speed of a switched reluctance motor including and excluding torque-based phase advance acceleration control.

Period timers may be used in conjunction with an interrupt routine upon receipt of an indication of a falling edge of a signal from the opto-sensing assembly 508 as illustrated in FIG. 21. In the disclosed embodiment, the period timers are 8 bit countdown timers which count down from 0 (256) to 1 and automatically reload. The resolution of the timers correspond to the crystal within the pulse generator 572 which is approximately a 10 MHz crystal, but may be a different crystal. One of the period timers may be designated timer 1 (T1) which is an 8 bit countdown timer which counts down from %FF (255) to 1 and stops. T1 is initialized with a divide by 64 prescaler. Thus, its resolution is 51.2 uS. Table 1 illustrates the portion of the values for the period timers.

TABLE 1

| T1 | T0 | time (uS) | uS @ 8 MHZ REF |
|---|---|---|---|
| FF | 00 | 0 | |
| FF | FF | 0.8 | 1 |
| FF | FE | 1.6 | 2 |
| FF | C1 | 50.4 | 63 |
| FE | C0 | 51.2 | 64 |
| FE | BF | 52 | 65 |
| FC | 01 | 204 | 255 |
| FB | 00 | 204.8 | 256 |
| FB | FF | 205.6 | 257 |

It should also be noted that the period timers count downward, not up. Additionally, the upper two bits of T0 contain redundant information. The two 8 bit values are merged or overlapped to produce a true 14 bit period. In order to calculate the period, it should be understood that "00" in T0 is equivalent to 256 and not 0. Thus, the maximum count is approximately 13,107 uS. There are a few microseconds that the timers are not running, and this time should be accounted for when calculating the period.

In some embodiments, one of the timers (e.g., T1) may be dedicated to the fixed-width PWM acceleration control. As the dedicated timer resets corresponding to a falling edge of the signal from the opto-sensing assembly 508, fixed-width pulses may be synchronized with the changing periods of the motor.

In some embodiments, one of the timers may correspond to the fast mode or phase-advance acceleration routine. Reference 1230 of FIG. 20 illustrates an embodiment where a single timer (identified as "ADVANCE TIMING (TIMER)") may be repeatedly used to coordinate various parameters for phase control during the fast mode. During fast mode, a sequencer TIMER_SEQ may operate throughout the duration of a single period to sequentially load values determined by the fast mode routine (e.g., block 770) into the single timer ADVANCE TIMING (TIMER). When a presently loaded value expires, a next value may be loaded into the single timer. Reference 1230 illustrates TIMER_SEQ loading a first time value into ADVANCE TIMING (TIMER) congruent with a falling edge of the signal from the opto-sensing assembly 508 or at the start of PERIOD, then a second time value at the end of DWELL_REMAINDER or the start of PHASE_DWELL_C, a third time value at the end of PHASE_DWELL_C or the start of ADVANCE, a fourth time value at the end of PHASE_DWELL, and a fifth time value at the start of an ADVANCE of a subsequent phase. The sequencer TIMER_SEQ may then begin loading time values afresh at the beginning of the next period. In this embodiment, the one or more parameter values may be expressed in units with respect to timer count value. Of course, other embodiments of one or more timers using other types of units may be contemplated and used in conjunction with the present disclosure.

An additional power level timer or other memory storage location (not illustrated) may be used in some embodiments to track an operational power level of the motor. For example, the additional power level timer or memory storage location may reflect whether or not a user has indicated a desired "HIGH" or "LOW" power level. The fast mode control routine may determine the desired positive torque zone size based on the value of the additional power level timer, and thus may affect the dwell time and the available torque produced by the motor based on the indicated operational power level. In some embodiments, the additional power level timer may be initialized to the desired "HIGH" power level at motor start-up.

In another embodiment, an additional timer or other memory storage location (not illustrated) may be used to track an operational speed of the motor. For example, the additional timer or memory storage location may reflect whether or not a user has indicated a desired "HIGH" or "LOW" speed setting of the motor. The fast mode control routine may determine the desired positive torque zone size based on the value of the additional timer, and thus may affect the dwell time and the available torque produced by the motor based on the indicated speed setting. In some embodiments, the additional timer may be initialized to correspond to the desired "HIGH" speed setting at motor start-up.

FIG. 21 is a graph of observed data for percent duty versus motor speed that was obtained from a switched-reluctance motor. The dashed line 1250 corresponds to the SR motor executing code without electronic, torque-based phase advance, and the solid line 1252 corresponds to the SR motor executing code with electronic, torque-based phase advance (e.g., the fast mode routine control code discussed in conjunction with FIGS. 17C, 17D, and 20).

The dashed line 1250 illustrates that without torque-based advance, phases were fired too early throughout the transition from slow mode to fast mode (reference 1255), i.e., in the area of negative torque, and thus braking was incurred. The solid line 1252 illustrates that with electronic, torque-based phase advance, the net positive sloping torque has been improved by a better handling of phase control. Here, the transition from slow mode to fast mode is demonstrated to be extremely efficient—almost a perfect step function (reference 1258). Additionally, as braking is significantly decreased, the fast mode code control with torque-based advance was observed to be much faster and audibly quieter.

As previously discussed, a threshold motor speed may be defined (e.g., S1 of FIG. 17A) so that below the threshold speed, fixed-width PWM is used to control acceleration of the motor, and above the threshold speed, phase-advance control is implemented. In some embodiments, at speeds above the threshold, phase-advance control may be executed concurrently with fixed-width PWM control. In these embodiments, one of the modes of acceleration control (e.g., either fixed-width PWM or phase-advance control) may override the other mode depending on the speed of the motor. That is, only one of the modes of acceleration will govern when a particular stator pole pair is de-energized.

To illustrate, FIG. 22A includes a group of waveforms 1300 produced by an embodiment of a motor configured in accordance with the methods and systems disclosed herein, where the threshold has been defined to be 9191 rpm, and the motor includes two rotor poles and two stator pole pairs. The waveforms correspond to the motor operating at a speed of 8940 rpm, and include a wave form 1302 corresponding to the signal from the opto-sensing assembly 508, a phase A waveform 1305, and a phase B waveform 1308. In this embodiment, at 8940 rpm, the motor is employing fixed-width PWM acceleration control, where the fixed-width of each pulse is x (reference 1310), and the half-period is $y_1$ (reference 1312).

FIG. 22B includes a group of waveforms 1320 for the same embodiment of the motor as FIG. 22A. Here, the motor is operating at a speed of 9270 rpm, e.g., above the threshold speed of 9191 rpm. The group of waveforms 1320 at 9270 rpm includes a waveform 1322 corresponding to the signal from the opto-sensing assembly 508, a phase A waveform 1325, and a phase B waveform 1328. In this embodiment, at 9270 rpm, phase-advance control occurs concurrently with fixed-width PWM control. By way of example, for torque-based control, a desired dwell time for the motor is determined to be 64% of the current half-period $y_2$ (reference 1330), or $0.64*y_2$. However, at 9270 rpm, the desired dwell time would extend a pulse for a longer duration than a fixed-width PWM pulse x (reference 1310), which may result in a high current spike that may overly tax the transistors (e.g., IGBTs 562-568) of the motor 10. Accordingly, in this embodiment, at 9270 rpm, the fixed-width PWM pulse control dominates the phase-advance control and may override the phase-advance control so that each phase is de-energized in correspondence with the fixed-width PWM pulse control. Thus, in the group of waveforms 1320, for each phase, the time w (reference 1332) that the phase is "low" or "off" due to the override of the fixed-width PWM pulse may be calculated by $w=(0.64*y_2)-x$.

As the motor accelerates, the period and the resulting desired dwell time decreases until the ideal, desired dwell time becomes shorter than the magnitude of a fixed-width PWM pulse (e.g., $(0.64*y_n)<x$). At this speed and at greater speeds, phase-advance control may dominate the fixed-width PWM pulse control and may override fixed-width PWM control. Current spikes may no longer be a concern at these higher speeds, so each phase may be de-energized in correspondence with the phase-advance control. In this embodiment of the motor, the desired dwell time becomes shorter than the fixed-width PWM pulse at about 19,200 rpm.

Figure 17E:
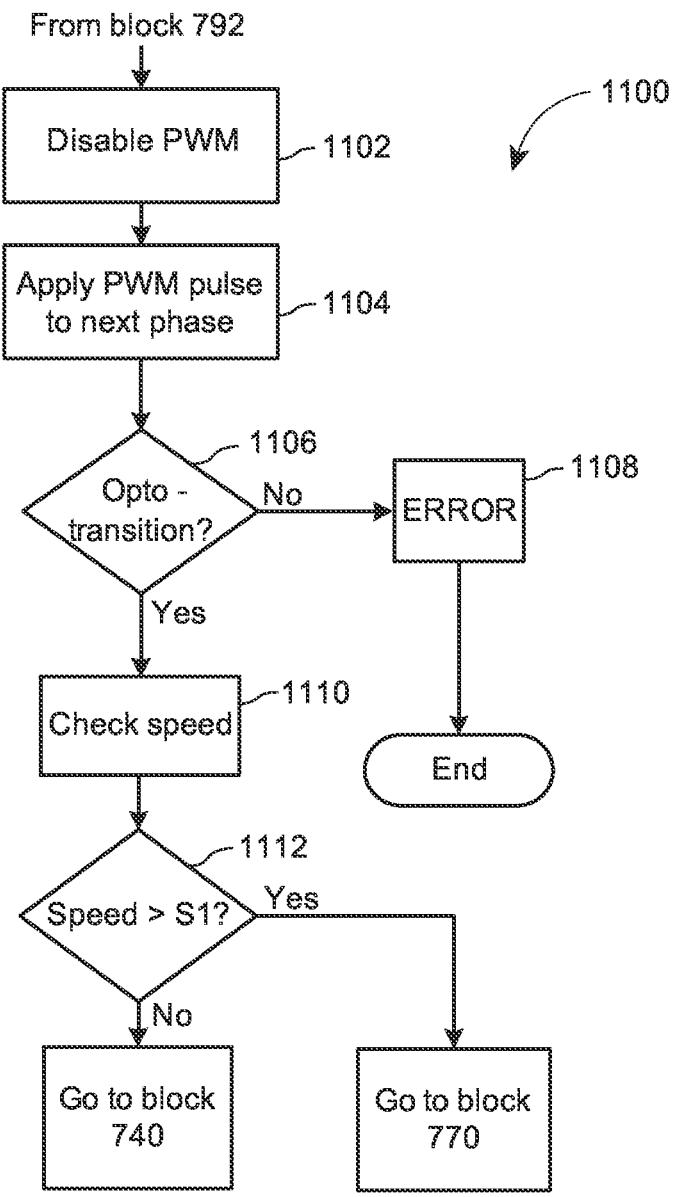

Turning back to FIG. 17C, as noted above, if at any time while the fast mode or phase-advance routine is activated 770, the speed of the motor at 785 is determined to be less than S1 (block 792), the routine shown in FIG. 17C will move to activate the transition routine 1100, detailed in FIG. 17E. In some situations, after the speed of the motor increases above S1, the speed of the motor may, under the influence of several factors, decrease below S1 shortly thereafter before again exceeding the threshold S1. For example, slight changes in the mechanical movement of the rotor 16 from one period to another, including slight changes in friction, may cause the speed of the motor to fluctuate about the threshold S1. As another example, changes in air turbulence encountered by the rotor 16 as the speed of the motor increases above the threshold S1, such as turbulence caused by an impeller system of the motor (not shown), may quickly cause the speed of the motor to drop below the threshold S1. Other factors having slight effects on motor speed are understood by those skilled in the art and are not further discussed herein.

FIG. 23 illustrates wave forms during a transition from the fast mode or phase-advanced routine to the slow mode or fixed-pulse width PWM routine. Reference 1426 illustrates the transition. FIG. 23 includes one wave form 1408 showing the PWM applied to phase A without employing the transition routine of FIG. 17E (described in detail below), and another wave form 1410 showing the PWM applied to phase A when the micro-controller 512 executes the transition routine of FIG. 17E. FIG. 23 also includes a wave form 1402 corresponding to the signal received from the opto-sensing assembly 508, and a wave form 1404 illustrating the PWM applied to phase B before and after the transition from fast mode to slow mode. Reference 1418 illustrates the period (PERIOD) or time between falling edges indicated by the signal from the opto-sensing assembly 508. Reference 1420 illustrates the determined advance (ADVANCE) of a subsequent phase A energization. This determined advance may be calculated in a manner similar to that discussed above with respect to the function described by the block 775 of FIG. 17D, or in another manner. Reference 1422 illustrates the PWM dwell or fixed width of each pulse in the slow mode (or fixed-pulse width PWM) routine.

The wave form 1408, showing the PWM applied to phase 'A' without employing the transition routine of FIG. 17E, is characterized by at least a portion of a phase-advanced PWM pulse generated by the fast mode routine occurring adjacent in time to a full slow mode PWM pulse. More particularly, the wave form 1408 includes an advance phase energization pulse having a duration corresponding to the determined advance 1420 (which occurs while the motor is still operating in fast mode), adjacent in time to a full slow mode PWM pulse having a duration corresponding to the PWM dwell (or fixed width) 1422 (which occurs after the speed of the motor drops below the threshold S1). Excess current caused by these back-to-back high pulses during transitioning from fast mode to slow mode may cause the IGBTs 562-568 to saturate and/or malfunction.

In order to alleviate the risk of saturation or malfunction of the IGBTs 562-568, the micro-controller 512 may execute a transition routine, such as the transition routine of FIG. 17E, to prevent such back-to-back high pulses. As shown in FIG. 17E, the transition routine begins with the disabling 1102 of power to the phase that received the phase-advanced PWM pulse upon determining that the speed of the motor has dropped from being above the pre-determined threshold to being below the pre-determined threshold, which is shown, for example, as a transition 1426 from fast mode to slow mode in FIG. 23. For example, a first fixed-width PWM pulse which would otherwise have been applied to the phase that received the phase-advanced PWM pulse is disabled (block 1102), thereby preventing the aforementioned back-to-back high pulses, according to an embodiment. The transition routine may then include applying additional PWM pulses to the phases of the motor 10. In this manner, the additional PWM pulses may be applied to the stator windings 32, via the switching device 518, such that the currents through IGBTs 562-568 (or other electronic switching mechanisms of the switching device 518) do not exceed corresponding maximum current capacities of the IGBTs 562-568. Thus, the risk of saturation or malfunction of the IGBTs 562-568 may be significantly reduced or even eliminated.

For example, a PWM pulse may be applied (block 1104) to the phase of the motor following the phase to which pulse width modulation was disabled (block 1102), before another determination of the speed of the motor 10 is made. For example, if a PWM pulse was disabled (block 1102) which would otherwise have been applied to phase A, a fixed-width PWM pulse may thereafter be applied to phase B (block 1104) before the next check of the speed of the motor 10. In another embodiment, the pre-determined threshold speed of the motor 10 may be low enough so that after the speed of the motor 10 drops below the pre-determined threshold, two or more fixed-width PWM pulses are applied to each phase during each period. Accordingly, implementing the function described by the block 1104 may first include applying a fixed-width PWM pulse to phase A that is not adjacent in time to the phase-advanced PWM pulse that was applied to phase A before the transition routine. Implementing the function described by the block 1104 may then include applying one or more fixed-width PWM pulses to phase B, as discussed above.

Continuing as to FIG. 17E, the transition routine 1100 may monitor for optical transitions as indicated by the opto-sensing assembly 508 corresponding to rotor movement (block 1106). If an expected opto-transition is not detected (block 1106), an error may be generated 1108. The error or fault may be logged and/or an LED (Light Emitting Diode) indicating the fault may be illuminated. In some embodiments, a reboot of the micro-controller 512 may be required to reset the detected fault condition (block 1108). On the other hand, if an expected opto-transition is detected (block 1106), the routine may check the rotational speed of the rotor 16 (block 1110). If it is determined that the rotational speed of the rotor 16 is less than the pre-determined threshold S1 (block 1112), the routine will move to activate the slow mode routine (block 740 of FIG. 17A). In the event that the slow mode routine is activated, fixed-width PWM pulses are thereafter applied to each phase of the stator windings 32 in the manner discussed above, as further seen from, for example, the wave form 1410. However, if it is determined (block 1112) that the rotational speed of the rotor 16 is greater than the pre-determined threshold S1, the routine will move to activate the fast mode routine (block 770 of FIG. 17C), in some embodiments. Of course, in some embodiments, if it is determined (block 1112) that the rotational speed of the rotor is greater than the pre-determined threshold S1, phase-advance control may be executed concurrently with fixed-width PWM control, and one of the phase-advance control or the fixed-width PWM control may override the other mode, as described above with respect to FIGS. 22A and 22B.

In any event, it will be appreciated that the disabling 1102 of PWM upon detection of a transition from fast mode to slow mode provides increased protection against saturation and/or malfunction of the IGBTs 562-568. Because, as a result of the disabling 1102, the micro-controller 512 does not provide PWM to phase A of the stator windings 32, a full slow mode PWM pulse does not occur immediately after the falling edge of the signal from the opto-sensing assembly 508 at which it is determined that the speed of the motor has dropped below the threshold S1. As a result, and as may be seen from the wave form 1410, no such pulse is adjacent in time to an advance phase energization pulse applied while the motor is still in fast mode. Therefore, the aforementioned back-to-back high pulses do not occur during the transition from fast mode to slow mode, and the risk of saturation and/or malfunction of the IGBTs 562-568 is significantly reduced or even eliminated.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed:

1. A method of accelerating a brushless, DC (BLDC) electric motor based on torque, comprising:
applying, in the BLDC electric motor, pulse-width modulation (PWM) pulses to a stator with a plurality of stator poles to cause a rotor with a plurality of rotor poles to rotate;
determining a slope based on a maximum torque of the BLDC electric motor at a first operating load and a maximum torque of the BLDC electric motor at a second operating load, the second operating load being greater than the first operating load;
generating, by a sensor for each partial revolution of the rotor, a first signal and a second signal;
determining a period of each partial revolution based on the first signal and the second signal;
determining a phase advance for a subsequent partial revolution of the rotor based on the period of each partial revolution and the slope; and
applying the phase advance to a subsequent PWM pulse applied to the plurality of stator poles corresponding to the subsequent partial revolution of the rotor.

2. The method of claim 1, further comprising determining a maximum load optimum advance, and wherein determining the phase advance for the subsequent partial revolution of the rotor comprises determining the phase advance based on the period of each partial revolution, the slope and the maximum load optimum advance.

3. The method of claim 1, further comprising determining a maximum load speed of the BLDC electric motor, and wherein determining the phase advance for the subsequent partial revolution of the rotor comprises determining the phase advance based on the period of each partial revolution, the slope and the maximum load speed.

4. The method of claim 1, further comprising determining a maximum load optimum advance, and wherein determining the phase advance for the subsequent partial revolution of the rotor comprises determining the phase advance based on the period of each partial revolution, a maximum load speed, the slope and the maximum load optimum advance.

5. The method of claim 1, further comprising:
determining a positive torque zone size including determining a portion of a radial relationship between the rotor and the stator during which a torque in a desired direction of rotor rotation is produced when a phase of the stator is energized; and
determining a phase dwell of the subsequent partial revolution of the rotor based on the positive torque zone size and the period,
wherein applying the phase advance to the subsequent PWM pulse comprises applying the phase advance and the phase dwell to the subsequent PWM pulse.

6. The method of claim 5, further comprising:
determining a dwell remainder based on the phase dwell and the phase advance;
determining a phase dwell complement based on the period and the phase dwell; and
applying the phase advance and the phase dwell to the subsequent PWM pulse, including applying the phase advance, the phase dwell, the dwell remainder, and the phase dwell complement to the subsequent PWM pulse.

7. The method of claim 1, wherein applying the phase advance to the subsequent PWM pulse comprises applying the phase advance to the subsequent PWM pulse when a speed of the BLDC electric motor exceeds a pre-determined threshold.

8. The method of claim 7, further comprising applying a subsequent fixed-width PWM pulse instead of applying the phase advance to the subsequent PWM pulse when the speed of the BLDC electric motor is below the pre-determined threshold.

9. The method of claim 1, wherein the sensor is an optical sensor disposed in the BLDC electric motor.

10. A system for controlling pulse-width modulation for a switched reluctance motor, comprising:
a controller;
a stator of the switched reluctance motor having a plurality of stator poles and communicatively coupled to the controller; and
a rotor of the switched reluctance motor having a plurality of rotor poles and configured to rotate in response to pulse-width modulation (PWM) pulses applied to the plurality of stator poles,
wherein the controller includes a memory having computer-executable instructions stored thereon for controlling acceleration of the switched reluctance motor based on torque, including:
determining a period of a first rotation of the rotor based on a first signal and a second signal generated by a sensor;
determining a phase advance for a subsequent rotation of the rotor based on the period of the first rotation and a slope, wherein the slope is based on a maximum torque of the switched reluctance motor at a lower operating load and a maximum torque of the switched reluctance motor at a higher operating load; and
applying the phase advance to a subsequent PWM pulse applied to a respective stator pole corresponding to the subsequent rotation of the rotor.

11. The system of claim 10, wherein the phase advance is further based on at least one of a maximum load speed or a maximum load optimum advance.

12. The system of claim 11, wherein at least one of the slope, the maximum load speed, or the maximum load optimum advance is at least one of pre-determined or adjustable.

13. The system of claim 10, further comprising a timer count, and wherein the phase advance, represented in units corresponding to a value of the timer count, is determined by a formula:

$$MLA - ((MLV - \text{PERIOD}/m)$$

wherein MLA is a maximum load optimum advance represented in the units corresponding to the timer count value, MLV is a maximum load speed, PERIOD is the period of the first rotation in the units corresponding to the timer count value, and m is the slope.

14. The system of claim 10, wherein:
the memory includes further computer-executable instructions for applying a phase dwell to the subsequent PWM pulse corresponding to the subsequent rotation of the rotor;
the phase dwell of the subsequent rotation of the rotor is based on a positive torque zone size and the period of the first rotation of the rotor; and
the positive torque zone size includes a portion of a radial relationship between the rotor and the stator characterized by when a phase of the stator is energized, a torque in a desired direction of rotor rotation is produced.

15. The system of claim 14, wherein the positive torque zone size is further based on at least one of a desired magnitude of the torque or a desired speed of the switched reluctance motor.

16. The system of claim 10, wherein the controller is configured to execute the computer-executable instructions for controlling acceleration of the switched reluctance motor based on torque when a speed of the switched reluctance motor is above a threshold.

17. The system of claim 16, wherein the controller is configured to execute further computer-executable instructions for controlling acceleration of the switched reluctance motor based on fixed-width PWM pulses instead of phase-advanced PWM pulses when the speed of the switched reluctance motor is below the threshold.

18. The system of claim 10, wherein the plurality of rotor poles comprises two rotor poles and the plurality of stator poles comprises two pairs of stator poles.

19. The system of claim 10, wherein the sensor is an optical sensor communicatively coupled to the controller and disposed in the switched reluctance motor so that when the rotor rotates, the optical sensor sends signals to the controller corresponding to rotor rotation.

20. A system for controlling pulse-width modulation (PWM) of a switched reluctance motor, comprising:
 a controller in electrical communication with a plurality of stator poles of a stator of the switched reluctance motor; and
 a memory included in the controller and having computer-executable instructions for controlling pulse-width modulation (PWM) pulses delivered to the plurality of stator poles, including instructions for:
  when a rotational speed of a rotor of the switched reluctance motor is less than or equal to a threshold, communicating that fixed-width PWM pulses are to be applied to the plurality of stator poles; and
  when the rotational speed of the rotor is greater than the threshold, communicating that torque-based PWM pulses are to be applied to the plurality of stator poles for each partial revolution of the rotor, including:
   determining a period of an immediately previous partial revolution of the rotor based on signals generated by an optical sensor, and
   determining a phase advance, a positive torque zone and a phase dwell for each torque-based PWM pulse, wherein:
    the phase advance is based on the period of the immediately previous partial revolution of the rotor and a slope,
    the slope is based on a maximum torque of the switched reluctance motor at a first operating load and a maximum torque of the switched reluctance motor at a second operating load, the second operating load being greater than the first operating load,
    the positive torque zone is based on a portion of a radial relationship between the rotor and the stator during which a torque in a desired direction of rotor rotation is produced when a phase of the stator is energized, and
    the phase dwell is based on the positive torque zone and the period of the immediately previous partial revolution of the rotor.

21. The system of claim 20, wherein the memory includes further computer-executable instructions for determining, for each torque-based PWM pulse, a dwell remainder based on the phase dwell and the phase advance, and a phase dwell complement based on the period and the phase dwell.

22. The system of claim 20, wherein the phase advance is further based on a maximum load advance and a maximum load speed, and wherein the maximum load advance, the maximum load speed, and the slope are pre-determined.

23. The system of claim 20, wherein th optical sensor is disposed in the switched reluctance motor and is communicatively connected to the controller to send the signals generated by the optical sensor, and wherein the rotational speed of the rotor is determined based on the signals generated by the optical sensor.

* * * * *